US011638125B2

(12) United States Patent
Kobel et al.

(10) Patent No.: US 11,638,125 B2
(45) Date of Patent: Apr. 25, 2023

(54) SYSTEM AND METHOD FOR AUTOMATIC GENERATION OF WORK SITE EQUIPMENT GROUPINGS

(71) Applicant: Oshkosh Corporation, Oshkosh, WI (US)

(72) Inventors: Korry D. Kobel, Oshkosh, WI (US); Fredric L. Yutzy, Oshkosh, WI (US); Dan Adamson, Oshkosh, WI (US); Stefan Eshleman, Oshkosh, WI (US); Patrick Booth, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 17/576,649

(22) Filed: Jan. 14, 2022

(65) Prior Publication Data

US 2022/0232352 A1   Jul. 21, 2022

Related U.S. Application Data

(60) Provisional application No. 63/138,016, filed on Jan. 15, 2021, provisional application No. 63/137,950, (Continued)

(51) Int. Cl.
*H04W 4/00* (2018.01)
*H04W 4/08* (2009.01)
(Continued)

(52) U.S. Cl.
CPC ............ *H04W 4/08* (2013.01); *B66F 9/0755* (2013.01); *B66F 9/07581* (2013.01); *B66F 9/12* (2013.01);
(Continued)

(58) Field of Classification Search
CPC ......... H04W 4/08; H04W 4/029; H04W 4/30; H04W 4/40; H04W 4/16; H04W 76/15;
(Continued)

(56) References Cited

U.S. PATENT DOCUMENTS 3,009,747 A   11/1961   Pitzer
4,099,761 A    7/1978   Cullings
(Continued)

FOREIGN PATENT DOCUMENTS

EP    3 112 312 A1    1/2017
EP    3 173 369 A1    5/2017
(Continued)

OTHER PUBLICATIONS

Notification of Transmittal of the International Search Report and the Written Opinion of the International Search Authority, or the Declaration issued in connection with PCT Appl. Ser. No. PCT/US2022/012603 dated Jul. 6, 2022 (27 pages).
(Continued)

*Primary Examiner* — Temica M Beamer
(74) *Attorney, Agent, or Firm* — Foley & Lardner LLP

(57) ABSTRACT

A system for automatic generation of a work site equipment grouping is provided. The system includes a plurality of work machines, each work machine configured to wirelessly communicate with other work machines. The system also includes a local area network including a plurality of communicatively connected nodes. The nodes include the work machines. The work machines are configured to create and join the local area network when the work machines are within a signal range of one or more of the plurality of nodes.

17 Claims, 18 Drawing Sheets

Related U.S. Application Data filed on Jan. 15, 2021, provisional application No. 63/137,996, filed on Jan. 15, 2021, provisional application No. 63/137,893, filed on Jan. 15, 2021, provisional application No. 63/138,003, filed on Jan. 15, 2021, provisional application No. 63/138,024, filed on Jan. 15, 2021, provisional application No. 63/137,955, filed on Jan. 15, 2021, provisional application No. 63/137,978, filed on Jan. 15, 2021, provisional application No. 63/138,015, filed on Jan. 15, 2021, provisional application No. 63/137,867, filed on Jan. 15, 2021.

(51) Int. Cl.

| | | |
|---|---|---|
| *H04W 4/30* | (2018.01) | |
| *H04L 67/63* | (2022.01) | |
| *H04L 67/52* | (2022.01) | |
| *H04W 48/16* | (2009.01) | |
| *G06F 3/0482* | (2013.01) | |
| *G06F 3/0484* | (2022.01) | |
| *G08B 3/00* | (2006.01) | |
| *G08B 5/36* | (2006.01) | |
| *G08B 7/06* | (2006.01) | |
| *G08B 21/18* | (2006.01) | |
| *G06Q 10/20* | (2023.01) | |
| *G06Q 30/0601* | (2023.01) | |
| *G06F 16/93* | (2019.01) | |
| *G05B 19/4155* | (2006.01) | |
| *B66F 9/12* | (2006.01) | |
| *G06F 3/0488* | (2022.01) | |
| *G07C 5/00* | (2006.01) | |
| *G07C 5/08* | (2006.01) | |
| *H04W 76/15* | (2018.01) | |
| *H04W 76/23* | (2018.01) | |
| *H04W 76/14* | (2018.01) | |
| *H04W 4/029* | (2018.01) | |
| *H04W 4/40* | (2018.01) | |
| *G05D 1/00* | (2006.01) | |
| *B66F 9/075* | (2006.01) | |
| *B66F 11/04* | (2006.01) | |
| *H04W 84/12* | (2009.01) | |
| *H04W 84/18* | (2009.01) | |
| *H04W 88/08* | (2009.01) | |
| *H04W 4/35* | (2018.01) | |
| *H04W 4/80* | (2018.01) | |

(52) U.S. Cl.
CPC ........ *B66F 11/046* (2013.01); *G05B 19/4155* (2013.01); *G05D 1/005* (2013.01); *G05D 1/0022* (2013.01); *G05D 1/0027* (2013.01); *G05D 1/0044* (2013.01); *G06F 3/0482* (2013.01); *G06F 3/0484* (2013.01); *G06F 3/0488* (2013.01); *G06F 16/93* (2019.01); *G06Q 10/20* (2013.01); *G06Q 30/0611* (2013.01); *G06Q 30/0631* (2013.01); *G06Q 30/0641* (2013.01); *G07C 5/006* (2013.01); *G07C 5/0825* (2013.01); *G08B 3/00* (2013.01); *G08B 5/36* (2013.01); *G08B 7/06* (2013.01); *G08B 21/18* (2013.01); *H04L 67/52* (2022.05); *H04L 67/63* (2022.05); *H04W 4/029* (2018.02); *H04W 4/30* (2018.02); *H04W 4/40* (2018.02); *H04W 48/16* (2013.01); *H04W 76/14* (2018.02); *H04W 76/15* (2018.02); *H04W 76/23* (2018.02); *G05B 2219/45049* (2013.01); *G05D 2201/0216* (2013.01); *H04W 4/35* (2018.02); *H04W 4/80* (2018.02); *H04W 84/12* (2013.01); *H04W 84/18* (2013.01); *H04W 88/08* (2013.01); *H04W 88/085* (2013.01)

(58) Field of Classification Search
CPC ....... H04W 76/14; H04W 76/23; G06F 16/93; G06F 3/0482; G06F 3/0484; G06F 3/0488; H04L 67/63; H04L 67/52; B66F 9/0755; B66F 9/07581; B66F 9/12; B66F 11/046; G05B 19/4155; G05D 1/0022; G05D 1/0027; G05D 1/0044; G05D 1/005; G06Q 10/20; G06Q 30/0611; G06Q 30/0631; G06Q 30/0641; G07C 5/006; G07C 5/0825; G08B 3/00; G08B 5/36; G08B 7/06; G08B 21/18
USPC ....................................................... 370/328
See application file for complete search history.

(56) References Cited

U.S. PATENT DOCUMENTS

| | | |
|---|---|---|
| 4,315,652 A | 2/1982 | Barwise |
| 4,426,110 A | 1/1984 | Mitchell et al. |
| 4,461,608 A | 7/1984 | Boda |
| 4,572,567 A | 2/1986 | Johnson |
| 4,573,728 A | 3/1986 | Johnson |
| 4,810,020 A | 3/1989 | Powell |
| 5,026,104 A | 6/1991 | Pickrell |
| 5,092,731 A | 3/1992 | Jones et al. |
| 5,209,537 A | 5/1993 | Smith et al. |
| 5,330,242 A | 7/1994 | Lucky, Sr. |
| 5,730,430 A | 3/1998 | Hodson et al. |
| 5,919,027 A | 7/1999 | Christenson |
| 5,934,858 A | 8/1999 | Christenson |
| 5,934,867 A | 8/1999 | Christenson |
| 5,938,394 A | 8/1999 | Christenson |
| 5,951,235 A | 9/1999 | Young et al. |
| 5,967,731 A | 10/1999 | Brandt |
| 5,984,609 A | 11/1999 | Bartlett |
| 6,033,176 A | 3/2000 | Bartlett |
| 6,062,803 A | 5/2000 | Christenson |
| 6,089,813 A | 7/2000 | McNeilus et al. |
| 6,120,235 A | 9/2000 | Humphries et al. |
| 6,123,500 A | 9/2000 | McNeilus et al. |
| 6,210,094 B1 | 4/2001 | McNeilus et al. |
| 6,213,706 B1 | 4/2001 | Christenson |
| 6,224,318 B1 | 5/2001 | McNeilus et al. |
| 6,264,013 B1 | 7/2001 | Hodgins |
| 6,315,515 B1 | 11/2001 | Young et al. |
| 6,336,783 B1 | 1/2002 | Young et al. |
| 6,350,098 B1 | 2/2002 | Christenson et al. |
| 6,447,239 B2 | 9/2002 | Young et al. |
| 6,474,928 B1 | 11/2002 | Christenson |
| 6,565,305 B2 | 5/2003 | Schrafel |
| 7,070,382 B2 | 7/2006 | Pruteanu et al. |
| 7,207,610 B1 | 4/2007 | Kauppila |
| 7,284,943 B2 | 10/2007 | Pruteanu et al. |
| 7,556,468 B2 | 7/2009 | Grata |
| 7,559,735 B2 | 7/2009 | Pruteanu et al. |
| 7,721,857 B2 | 5/2010 | Harr |
| 7,878,750 B2 | 2/2011 | Zhou et al. |
| 7,934,758 B2 | 5/2011 | Stamey et al. |
| 8,182,194 B2 | 5/2012 | Pruteanu et al. |
| 8,215,892 B2 | 7/2012 | Calliari |
| 8,360,706 B2 | 1/2013 | Addleman et al. |
| 8,540,475 B2 | 9/2013 | Kuriakose et al. |
| 8,655,505 B2 | 2/2014 | Sprock et al. |
| 8,807,613 B2 | 8/2014 | Howell et al. |
| 8,833,823 B2 | 9/2014 | Price et al. |
| 9,028,193 B2 | 5/2015 | Goedken |
| 9,216,856 B2 | 12/2015 | Howell et al. |
| 9,387,985 B2 | 7/2016 | Gillmore et al. |
| 9,624,033 B1 | 4/2017 | Price et al. |
| 9,694,776 B2 | 7/2017 | Nelson et al. |
| 9,880,581 B2 | 1/2018 | Kuriakose et al. |

(56) References Cited

U.S. PATENT DOCUMENTS

| | | | |
|---|---|---|---|
| 9,981,803 | B2 | 5/2018 | Davis et al. |
| 10,035,648 | B2 | 7/2018 | Haddick et al. |
| 10,196,205 | B2 | 2/2019 | Betz et al. |
| 10,221,012 | B2 | 3/2019 | Hund, Jr. |
| 10,457,533 | B2 | 10/2019 | Puszkiewicz et al. |
| 10,899,538 | B2 | 1/2021 | Nelson et al. |
| 2002/0079713 | A1 | 6/2002 | Moilanen et al. |
| 2002/0123345 | A1* | 9/2002 | Mahany .............. H04W 84/18 455/432.1 |
| 2003/0158640 | A1 | 8/2003 | Pillar et al. |
| 2005/0140154 | A1 | 6/2005 | Vigholm et al. |
| 2005/0149920 | A1 | 7/2005 | Patrizi et al. |
| 2009/0005928 | A1 | 1/2009 | Sells et al. |
| 2009/0049441 | A1 | 2/2009 | Mii et al. |
| 2009/0099897 | A1 | 4/2009 | Ehrman et al. |
| 2011/0081193 | A1 | 4/2011 | Nilsson |
| 2012/0046809 | A1 | 2/2012 | Wellman |
| 2013/0057007 | A1 | 3/2013 | Howell et al. |
| 2013/0240300 | A1 | 9/2013 | Fagan et al. |
| 2014/0278621 | A1 | 9/2014 | Medwin et al. |
| 2014/0312639 | A1 | 10/2014 | Petronek |
| 2015/0376869 | A1 | 12/2015 | Jackson |
| 2016/0121490 | A1 | 5/2016 | Ottersland |
| 2016/0208992 | A1 | 7/2016 | Parsons |
| 2016/0272471 | A1 | 9/2016 | Jaipaul |
| 2016/0304051 | A1 | 10/2016 | Archer et al. |
| 2016/0318438 | A1 | 11/2016 | Wadell |
| 2018/0143734 | A1 | 5/2018 | Ochenas et al. |
| 2020/0134955 | A1 | 4/2020 | Kishita |

FOREIGN PATENT DOCUMENTS

| | | |
|---|---|---|
| EP | 3 200 482 A1 | 8/2017 |
| JP | H1059698 A | 3/1998 |
| WO | WO-01/30671 A2 | 5/2001 |
| WO | WO-2011/019872 A2 | 2/2011 |
| WO | WO-2012/109444 A2 | 8/2012 |

OTHER PUBLICATIONS

Notification of Transmittal of the International Search Report and the Written Opinion of the International Search Authority, or the Declaration issued in connection with PCT Appl. Ser. No. PCT/US2022/012628 dated Jul. 6, 2022 (27 pages).

International Search Report and Written Opinion issued in connection with PCT Appl. Ser. No. PCT/US2022/012610 dated Jun. 21, 2022 (19 pages).

Invitation to Pay Additional Fees issued in connection with PCT Appl. Ser. No. PCT/US2022/012610 dated Apr. 28, 2022 (136 pages).

Invitation to Pay Additional Fees issued in connection with PCT Appl. Ser. No. PCT/US2022/012628 dated May 13, 2022 (134 pages).

* cited by examiner

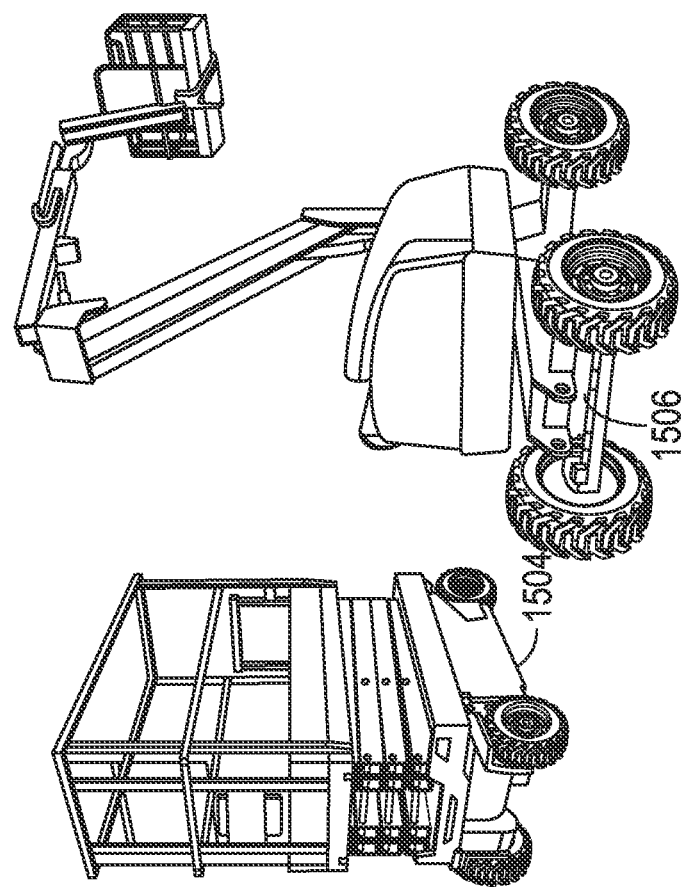
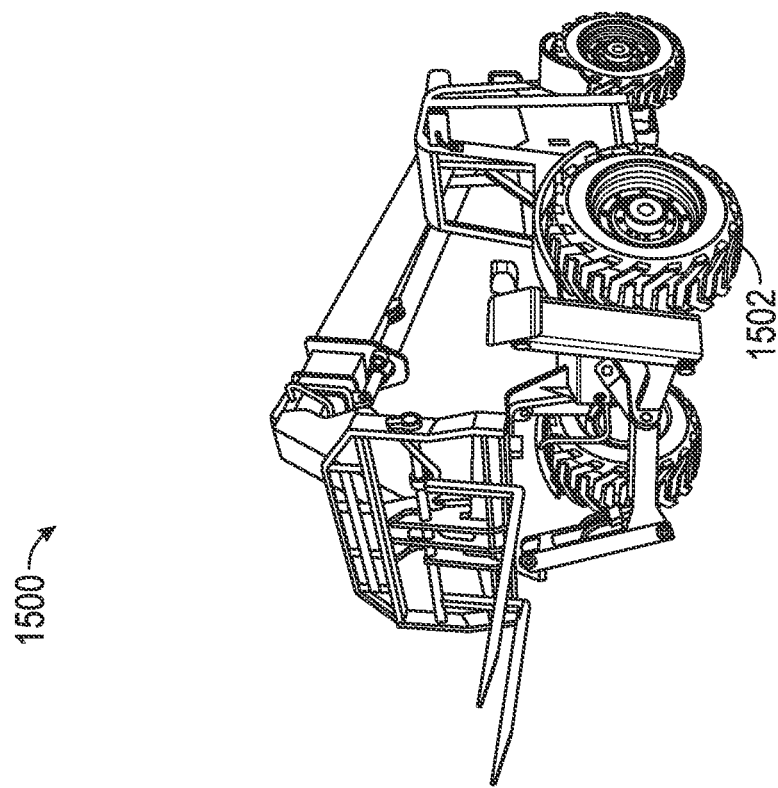
FIG. 15

SYSTEM AND METHOD FOR AUTOMATIC GENERATION OF WORK SITE EQUIPMENT GROUPINGS

CROSS-REFERENCE TO RELATED PATENT APPLICATIONS

This application claims the benefit of U.S. Provisional Application No. 63/137,950, filed on Jan. 15, 2021, U.S. Provisional Application No. 63/137,955, filed on Jan. 15, 2021, U.S. Provisional Application No. 63/137,996, filed on Jan. 15, 2021, U.S. Provisional Application No. 63/138,003, filed on Jan. 15, 2021, U.S. Provisional Application No. 63/138,015, filed on Jan. 15, 2021, U.S. Provisional Application No. 63/138,016, filed on Jan. 15, 2021, U.S. Provisional Application No. 63/138,024, filed on Jan. 15, 2021, U.S. Provisional Application No. 63/137,867, filed on Jan. 15, 2021, U.S. Provisional Application No. 63/137,893, filed on Jan. 15, 2021, and U.S. Provisional Application No. 63/137,978, filed on Jan. 15, 2021, all of which are incorporated herein by reference in their entireties.

BACKGROUND

Work equipment such as lifts and telehandlers sometimes require tracking, tasking, monitoring, and servicing at a work site. Managers and operators of working machines typically rely on discrete systems, applications, and methods to perform these functions for each piece of equipment.

SUMMARY OF THE INVENTION

One exemplary embodiment relates to a system for automatic generation of a work site equipment grouping. The system includes a plurality of work machines, each work machine configured to wirelessly communicate with other work machines, and a local area network including a plurality of communicatively connected nodes, the nodes comprising the work machine. The work machines are configured to create and join the local area network when the work machines are within a signal range of one or more of the plurality of nodes.

In some aspects, each machine is configured to transmit, via the local area network, machine-specific data to the other machines. The machine-specific data may include on or more of, a location of a machine, an operational height of a lifting implement of a machine, a location of the lifting implement, a speed of a machine, a direction of travel of a machine, or environmental sensor readings. In some aspects, at least one node is communicatively connected to a remote computing system, and wherein the remote computing system is configured to process data from the local area network. In some aspects, a network identifier is automatically generated when the local area network is created. In some aspects, the local area network is a mesh network. In some aspects, the system may include a user device, wherein at least one node is communicatively connected to the user device, and wherein the user device is configured to display a list of machines connected to the local area network as a group. In some aspects, the user device is configured to receive a notification when a machine joins or leaves the local area network. In some aspects, machines are configured to be removed from the local area network based on inputs from the user device or based on predefined criteria. In some aspects, in order to join the local area network, a machine is required to transmit an access code to at least one machine connected to the local area network. In some aspects, each work machine is communicatively connected to the local area network via a connectivity module coupled to each respective work machine. In some aspects a first work machine is configured to detect a second work machine within the signal range, and in response to detecting the second work machine, create the local area network by forming a wireless connection with the second work machine.

In another exemplary embodiment, a first work machine includes a chassis, a lifting implement coupled to the chassis, a connectivity module coupled to the chassis, the connectivity module configured to wirelessly communicate with nodes in a network and one or more processing circuits coupled to the connectivity module. The one or more processing circuits include one or more memory devices coupled to one or more processors. The one or more memory devices are configured to store instructions thereon that, when executed by the one or more processors, cause the one or more processors to detect, via the connectivity module, a second work machine within a signal radius of the connectivity module; send, via the connectivity module, a message to the second work machine inviting the second work machine to form a local area network with the first work machine; receive, via the connectivity module, a confirmatory message from the second work machine; and form the local area network with the second work machine.

In some aspects, the connectivity module comprises a beacon, and wherein the instructions further cause the one or more processors to instruct, in response to forming the local area network, the beacon to provide an indication that the network has formed. In some aspects, the instructions further cause the one or more processors to detect, via the connectivity module, a third work machine within a signal radius of the connectivity module; send, via the connectivity module, a message to the third work machine inviting the third work machine to join the local area network; receive, via the connectivity module, a confirmatory message from the third work machine; and add the third work machine to the local area network. In some aspects, the instructions further cause the one or more processors to send, via the connectivity module, a notification to a user device communicatively coupled to the local area network that the third work machine has been added to the local area network. In some aspects, the instructions further cause the one or more processors to detect, via the connectivity module that the one of the second work machine or the third work machine has been disconnected from the local area network; send, via the connectivity module in response to detecting that the second work machine has been disconnected the local area network, a notification, to a user device communicatively coupled to the local area network, that the second work machine has left the local area network; and send, via the connectivity module in response to detecting that the third work machine has left the local area network, a notification, to a user device communicatively coupled to the local area network, that the third work machine has left the local area network.

In another exemplary embodiment, a first work machine includes a chassis, a lifting implement coupled to the chassis, a connectivity module coupled to the chassis, the connectivity module configured to wirelessly communicate with nodes in a network, one or more processing circuits coupled to the connectivity module. The one or more processing circuits include one or more memory devices coupled to one or more processors. The one or more memory devices are configured to store instructions thereon that, when executed by the one or more processors, cause the one or more processors to detect, via the connectivity module, a local area network within a signal radius of the connectivity module, the local area network comprising a plurality of work machines; send, via the connectivity module, a message requesting to join the local area network; receive, via the connectivity module, a confirmatory message from one of the plurality of work machines; and join the local area network.

In some aspects, the instructions further cause the one or more processors to send, via the connectivity module, a notification to a user device communicatively coupled to the local area network that the first work machine has joined the local area network. In some aspects, the connectivity module comprises a beacon, and wherein the instructions further cause the one or more processors to instruct, in response to detecting that the first work machine has been disconnected from the local area network, the beacon to provide an indication that the first work machine has left the local area network.

Another exemplary embodiment relates to a system for automatic generation of a work site equipment grouping of wirelessly networked work machines. For example, an automatic work site equipment grouping system may automatically associate work machines to one another in a work site group where the work machines are wirelessly connected on a local area network at a work site. The automatic work site equipment grouping system may transmit information related to machines in the work site group to the cloud for data processing and for simple fleet management. The automatic work site equipment grouping system may enable, for example, all machines on a particular work site to be easily be identified, accessed, and grouped (e.g. including designation with a work site group name by a user). In some examples, the automatic work site equipment grouping system may generate notifications to alert users with correct permissions when machines are checked in or out. The system for automatic generation of a work site equipment grouping may be implemented, for example, in a local fleet connectivity system (e.g., an interactivity and productivity tool for local fleet connectivity). The local fleet connectivity system may include a network of communicatively connected work machines. Network connections between work machines and other nodes connected to the system may include low energy wireless data networks, mesh networks, satellite communications networks, cellular networks, or wireless data networks. In some implementations, the network of work machines may be a local fleet connectivity system initiated by automatic exchange of networking messages between different machines in the plurality of communicatively connected work machines. In some implementations, a network node is associated with each machine in the plurality of networked machines. In some implementations, a first machine extends a connection to a second machine in proximity to the first machine on a work site to establish a network link at the work site one. A work site network may be established among a fleet of work machines at the work site where machines connect with other nearby machines in a mesh network. In some implementations, network access is enabled according to one or more access codes. Access to machine-specific data for one or more machines connected to the network is provided according to the one or more access codes. In some implementations, interconnectivity and productivity related data is exchanged via connectivity modules. The connectivity module may be communicatively connected to a machine controller. The connectivity module may be a self-contained unit. The controller may host one or more interconnectivity and productivity applications. The one or more connectivity and productivity applications hosted by the plurality of controllers may be local instances of a remotely hosted master interconnectivity and productivity application. In some embodiments, the communications means between equipment connected to the local fleet connectivity system may comprise wired networking, short range radio frequency networking (e.g. Bluetooth, Bluetooth Low Energy, Wi-Fi, VHF, or UHF), optical communications networking, or long range radio frequency networking (e.g. satellite communications).

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

BRIEF DESCRIPTION OF THE DRAWINGS

FIG. 15 is a combination picture and drawing representation of work machines connected to a local fleet connectivity system, according to some embodiments.

DETAILED DESCRIPTION

Figure 1:
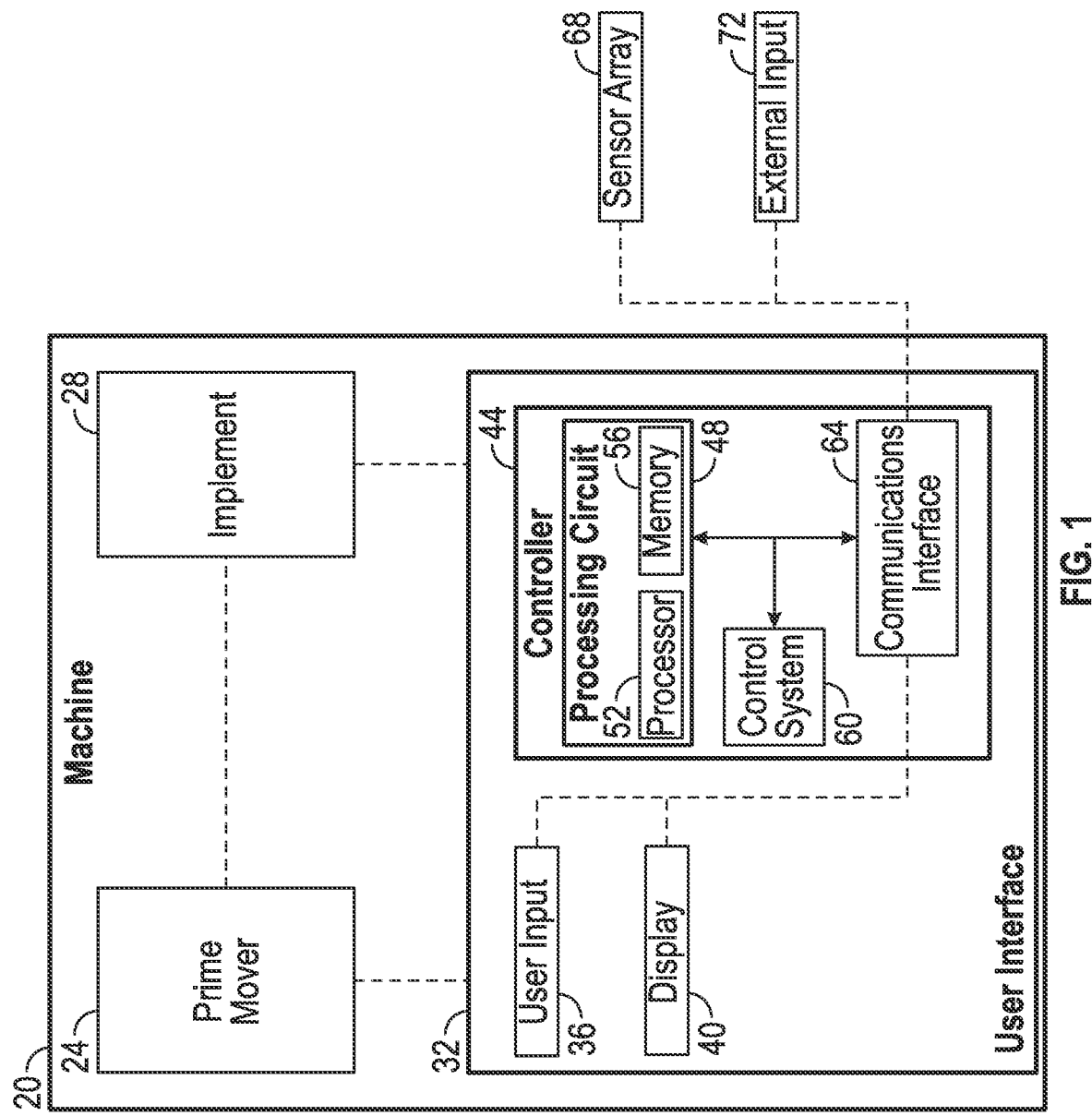
FIG. 1 is a schematic representation of a work machine including a machine control module according to some embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Work equipment such as lifts and telehandlers sometimes require tracking, tasking, monitoring, and servicing at a work site. Managers and operators of working machines typically rely on discrete systems, applications, and methods to perform these functions for each piece of equipment. It is therefore desirable to provide a means to automatically electronically connect and group work equipment on a work site and integrate tracking, tasking, monitoring, and service support functions on a common platform to improve efficiency and reduce costs.

Referring to the figures generally, various exemplary embodiments disclosed herein relate to systems and methods for automatic generation of a work site equipment grouping of wirelessly networked work machines. For example, system of work machines connected on a local area network may automatically associate a group of machines at a work site and exchange machine group information with nodes connected to the cloud for data processing and for simple fleet management. The system implemented within a local fleet connectivity system may, for example, automatically generate the group of machines as a local fleet, a work site fleet, or other classification such that the automatically generated "work site" group facilitates identification and access of the machines in the group. In a further example, a group of all connected machines on a particular work site may be easily identified, accessed, and grouped by site. Additionally, the system for automatic generation of a work site equipment grouping may generate notifications to alert users with access permissions when machines are checked in or out. In another example, the system for automatic generation of a work site equipment grouping is configured to authenticate a network connection request from a device to prevent hacking. The system may also initiate a reset of a work machine in a work site equipment grouping when the machine goes into a selected and defined mode (e.g., tow mode, etc.). The system is also configured to support enterprise resource planning (ERP) integrations into rental contracts for time and location based data inputs from connected machines. The system for automatic generation of a work site equipment grouping may interoperate, for example, with a local fleet connectivity system that employs Bluetooth Low Energy (BLE) Machine to Machine (M2M) communication protocols to expand communication and improve productivity at a work site/jobsite.

Further referring to the figures generally, the various exemplary embodiments disclosed herein relate to systems, apparatuses, and methods for a system for automatic generation of a work site equipment grouping that is interoperable with a local fleet connectivity system. In some embodiments, the local fleet connectivity system can comprise work machines, interface modules, work site equipment, communications devices, communications networks, user interface devices, devices hosting self-forming network software (e.g. local fleet connectivity system software), equipment users, equipment maintainers, and equipment suppliers. The information provided to the local fleet connectivity system can be communicated to a machine operator via a user interface. In some embodiments, the user interface includes a real time map, showing a current machine location, a machine status. In some embodiments, the user interface includes a color coded warning indicator, an audible alarm, or another indicator structured to communicate to the machine operator that the work machine is in a location or state that requires the attention of the operator.

As shown in FIG. 1, a work machine 20 (e.g., a telehandler, a boom lift, a scissor lift, etc.) includes a prime mover 24 (e.g., a spark ignition engine, a compression ignition engine, an electric motor, a generator set, a hybrid system, etc.) structured to supply power to the work machine 20, and an implement 28 driven by prime mover 24. In some embodiments, the implement 28 is a lift boom, a scissor lift, a telehandler arm, etc.

A user interface 32 is arranged in communication with the prime mover 24 and the implement 28 to control operations of the work machine 20 and includes a user input 36 that allows a machine operator to interact with the user interface 32, a display 40 for communicating to the machine operator (e.g., a display screen, a lamp or light, an audio device, a dial, or another display or output device), and a control module 44.

As the components of FIG. 1 are shown to be embodied in the work machine 20, the controller 44 may be structured as one or more electronic control units (ECU). The controller 44 may be separate from or included with at least one of an implement control unit, an exhaust after-treatment control unit, a powertrain control module, an engine control module, etc. In some embodiments, the control module 44 includes a processing circuit 48 having a processor 52 and a memory device 56, a control system 60, and a communications interface 64. Generally, the control module 44 is structured to receive inputs and generate outputs for or from a sensor array 68 and external inputs or outputs 72 (e.g. a load map, a machine-to-machine communication, a fleet management system, a user interface, a network, etc.) via the communications interface 64.

The control system 60 generates a range of inputs, outputs, and user interfaces. The inputs, outputs, and user interfaces may be related to a jobsite, a status of a piece of equipment, environmental conditions, equipment telematics, an equipment location, task instructions, sensor data, equipment consumables data (e.g. a fuel level, a condition of a battery), status, location, or sensor data from another connected piece of equipment, communications link availability and status, hazard information, positions of objects relative to a piece of equipment, device configuration data, part tracking data, text and graphic messages, weather alerts, equipment operation, maintenance, and service data, equipment beacon commands, tracking data, performance data, cost data, operating and idle time data, remote operation commands, reprogramming and reconfiguration data and commands, self-test commands and data, software as a service data and commands, advertising information, access control commands and data, onboard literature, machine software revision data, fleet management commands and data, logistics data, equipment inspection data including inspection of another piece of equipment using onboard sensors, prioritization of communication link use, predictive maintenance data, tagged consumable data, remote fault detection data, machine synchronization commands and data including cooperative operation of machines, equipment data bus information, operator notification data, work machine twinning displays, commands, and data, etc.

The sensor array 68 can include physical and virtual sensors for determining work machine states, work machine conditions, work machine locations, loads, and location devices. In some embodiments, the sensor array includes a GPS device, a LIDAR location device, inertial navigation, or other sensors structured to determine a position of the equipment 20 relative to locations, maps, other equipment, objects or other reference points.

In one configuration, the control system 60 is embodied as machine or computer-readable media that is executable by a processor, such as processor 52. As described herein and amongst other uses, the machine-readable media facilitates performance of certain operations to enable reception and transmission of data. For example, the machine-readable media may provide an instruction (e.g., command, etc.) to, e.g., acquire data. In this regard, the machine-readable media may include programmable logic that defines the frequency of acquisition of the data (or, transmission of the data). The computer readable media may include code, which may be written in any programming language including, but not limited to, Java or the like and any conventional procedural programming languages, such as the "C" programming language or similar programming languages. The computer readable program code may be executed on one processor or multiple remote processors. In the latter scenario, the remote processors may be connected to each other through any type of network (e.g., CAN bus, etc.).

In another configuration, the control system 60 is embodied as hardware units, such as electronic control units. As such, the control system 60 may be embodied as one or more circuitry components including, but not limited to, processing circuitry, network interfaces, peripheral devices, input devices, output devices, sensors, etc. In some embodiments, the control system 60 may take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the control system 60 may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on). The control system 60 may also include programmable hardware devices such as field programmable gate arrays, programmable array logic, programmable logic devices or the like. The control system 60 may include one or more memory devices for storing instructions that are executable by the processor(s) of the control system 60. The one or more memory devices and processor(s) may have the same definition as provided below with respect to the memory device 56 and processor 52. In some hardware unit configurations, the control system 60 may be geographically dispersed throughout separate locations in the machine. Alternatively, and as shown, the control system 60 may be embodied in or within a single unit/housing, which is shown as the controller 44.

In the example shown, the control module 44 includes the processing circuit 48 having the processor 52 and the memory device 56. The processing circuit 48 may be structured or configured to execute or implement the instructions, commands, and/or control processes described herein with respect to control system 60. The depicted configuration represents the control system 60 as machine or computer-readable media. However, as mentioned above, this illustration is not meant to be limiting as the present disclosure contemplates other embodiments where the control system 60, or at least one circuit of the control system 60, is configured as a hardware unit. All such combinations and variations are intended to fall within the scope of the present disclosure.

The hardware and data processing components used to implement the various processes, operations, illustrative logics, logical blocks, modules and circuits described in connection with the embodiments disclosed herein (e.g., the processor 52) may be implemented or performed with a general purpose single- or multi-chip processor, a digital signal processor (DSP), an application specific integrated circuit (ASIC), a field programmable gate array (FPGA), or other programmable logic device, discrete gate or transistor logic, discrete hardware components, or any combination thereof designed to perform the functions described herein. A general purpose processor may be a microprocessor, or, any conventional processor, or state machine. A processor also may be implemented as a combination of computing devices, such as a combination of a DSP and a microprocessor, a plurality of microprocessors, one or more microprocessors in conjunction with a DSP core, or any other such configuration. In some embodiments, the one or more processors may be shared by multiple circuits (e.g., control system 60 may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. All such variations are intended to fall within the scope of the present disclosure.

The memory device 56 (e.g., memory, memory unit, storage device) may include one or more devices (e.g., RAM, ROM, Flash memory, hard disk storage) for storing data and/or computer code for completing or facilitating the various processes, layers and modules described in the present disclosure. The memory device 56 may be communicably connected to the processor 52 to provide computer code or instructions to the processor 52 for executing at least some of the processes described herein. Moreover, the memory device 56 may be or include tangible, non-transient volatile memory or non-volatile memory. Accordingly, the memory device 56 may include database components, object code components, script components, or any other type of information structure for supporting the various activities and information structures described herein.

In an exemplary embodiment, the memory device 56 stores instructions for execution by the processor 52 for a process to automatically generate a work site equipment grouping. The process to automatically generate a work site equipment grouping automatically associates machines 20 connected on a near a network to one or more other machines 20. In some embodiments, the automatic associations are based on association rules stored on a work machine or on another network node. In some embodiments, the association rules are based on one or more of a work site designation, a location of a machine, or a code (e.g. a customer key, a manufacturer key, or a maintainer key).

Figure 2:
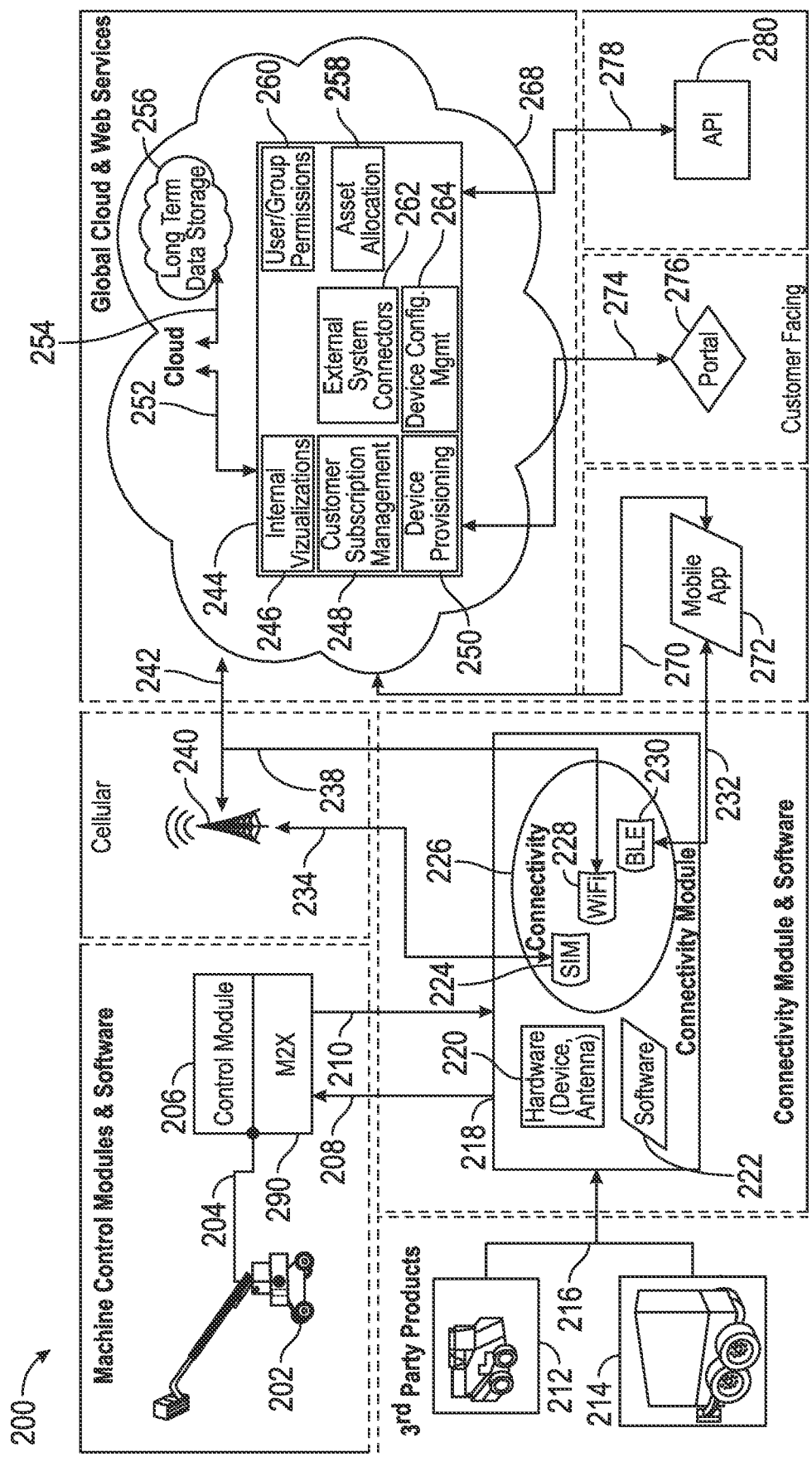
FIG. 2 is a schematic representation of a local fleet connectivity system, according to some embodiments.

As shown in FIG. 2, the system for automatic generation of work site equipment groupings 200 is supported by a network of nodes. The network of nodes may include one or more work machines 202, each with a control module 206, one or more connectivity modules 218, and one or more network devices hosting, for example, user devices 272 including user interfaces, network portals 276, application interfaces/application programming interfaces 280, data storage systems 256, cloud and web services, and product development tool and application hubs 244.

The work machine 202 is communicably connected to a control module 206. The connection 204 between the work machine 202 and the control module 206 may be wired or wireless thus providing the flexibility to integrate the control module with the work machine 202 or to temporarily attach the control module 206 to the work machine 202. The control module 206 may be configured or may be reconfigurable in both hardware and software to interface with a variety of work machines 202, 212, 214 via the connectivity module 218. The control module 206 may comprise an integral power source or may draw power from the work machine 202 or another external source of power. Control modules 206 may be installed on or connected, e.g., via a connection 216, to products (e.g. third party products 212, 214) not configured by the original product manufacturer with a control module 206.

The work machine 202 communicably connects to the system for automatic generation of worksite equipment groupings via a machine-to-X (M2X) module 290. The M2X module 290 is communicably connected to the control module 206. The M2X module 290 establishes one or more communications channels 208, 210 with a connectivity module 218. The connectivity module 218 provides a plurality of links between one or more work machines 202, 212, 214 and the system for automatic generation of work site equipment groupings 200. Applications providing functions for the system for automatic generation of work site equipment groupings 200 may be run by the M2X modules on one or more work machines 202. One or more user devices 272 may be configured to communicate (e.g., to exchange commands, codes (e.g. a customer key) and data) with the connectivity modules of one or more machines via a network connection, for example via a local wireless connectivity system or via a cellular networks (e.g., via cell towers 240) to form a network of interconnections among machines, devices, or nodes. Connections between machines and user devices in the system for automatic generation of work site equipment groupings may be provided by a wireless mesh network, for example.

The connectivity module 218 comprises hardware 220, further comprising antennas, switching circuits, filters, amplifiers, mixers, and other signal processing devices for a plurality of wavelengths, frequencies, etc., software hosted on a non-volatile memory components 222, and a communications manager 226. The communications manager 226 may comprise processing circuits with communications front ends 224, 228, and 230 for one or more signal formats and waveforms including, for example, Bluetooth, Bluetooth low energy, Wi-Fi, cellular, optical, and satellite communications. The connectivity module 218 may function as a gateway device connecting work machine 202 to other work machines 212, 214, remote computing systems 244, 272, 276, and 280, beacons, scheduling or other fleet management and coordination systems.

The system for automatic generation of work site equipment groupings 200 allows for the coordination of multiple machines 202, 212, 214 within the same work site, or a fleet wide control. For example, a work machine 202 may remotely report the results of a self-inspection to a user via a user device 272.

The system for automatic generation of work site equipment groupings 200 provides connectivity between work machines 202, 212, 214 and remotely hosted user interfaces 272, network portals 276, application interfaces/application programming interfaces 280, data storage systems 256, cloud and web services 268, and product development tool and application hubs 244 that function as an Internet of Things (IoT) system for operation, control, and support of work machines 202, 212, 214 and users of work machines. Connections 232, 234, 238, 242, 252, 254, 270, 274, and 278 between nodes connected to the system for automatic generation of work site equipment groupings 200 may comprise, for example, cellular networks, or other existing or new means of digital connectivity.

Product development tool and application hubs 244 may comprise tools and applications for internal visualizations 246, customer subscription management 248, device provisioning 250, external systems connectors 262, device configuration management 264, user/group permissions 260, asset allocation 258, fleet management, compliance, etc.

Figure 3:
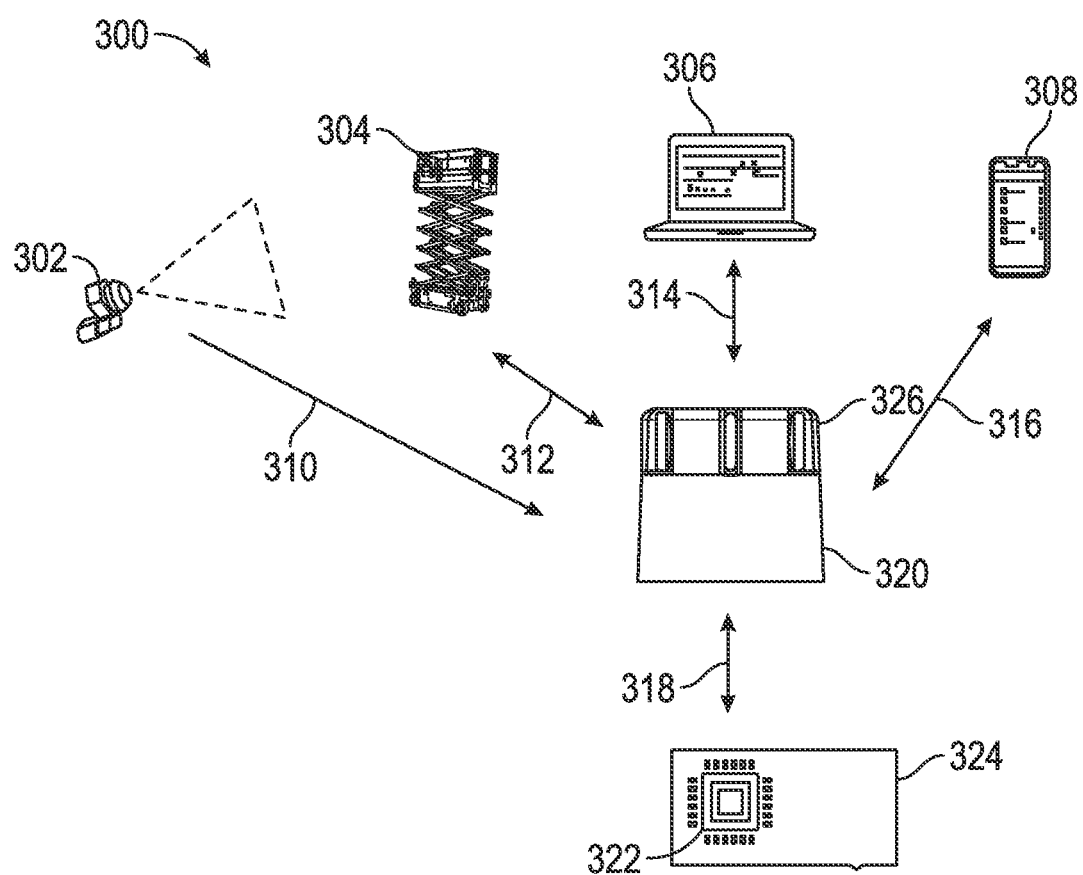
FIG. 3 is a schematic representation of a local fleet connectivity system with a central integration module, according to some embodiments.

FIG. 3 shows system for automatic generation of work site equipment groupings 300 according to an exemplary embodiment. As shown in FIG. 3, the connectivity module 320 functions as a communications interface 318 between a control system 322 of the work machine 324 and other elements connected to the system for automatic generation of work site equipment groupings 300. The connectivity module 320 may be part of the work machine 324 or may be physically coupled to the work machine 324. The connectivity module 320 may exchange commands and data 318 with the control system 322 of the work machine 324, sensor data 310 with auxiliary sensors 302, machine data 312 with another machine 304, commands and data 314 with a node or portal 306, and commands and data 316 with a user device 308 running an application for the system for automatic generation of work site equipment groupings 300. The connectivity module 320 may exchange commands, codes (e.g. a customer key) and data between work machines 304, 324, user devices 308, and/or nodes 306 to form a network of interconnections among machines, devices, or nodes.

The system for automatic generation of a work site equipment grouping 300 allows for the coordination of multiple machines 304, 324 within the same work site, or a fleet wide control. For example, if a first work machine 304 is required to accomplish a task collaboratively with a second work machine 324, a user interacting with a user device 308 may provide commands to the first work machine 304 and second work machine 324 to execute the task in collaboration. In some embodiments, the system for automatic generation of a work site equipment grouping 300 is an application hosted on one or more processors connected to the system for automatic generation of work site equipment groupings 300. In some embodiments, the system for automatic generation of a work site equipment grouping may automatically associate machines 304, 324 that are connected on a local area network to one another. In some embodiments the equipment grouping system may transmit this information to the cloud 314 for data processing and for simple fleet management. In other words all machines on a particular job-site could easily be identified and accessed and grouped by site. Notifications could also be used to alert persons with the correct permissions when machines are checked in or out. In some examples, the equipment grouping system may provide measures to prevent unauthorized physical and electronic access to machines (e.g. anti-hacking applications, key codes, etc.). In some examples, the equipment grouping system resets a grouping of equipment when a machine in the group goes into a selected or defined mode (e.g. tow mode, etc.). In some examples, the equipment grouping system is communicably connected to an electronic commerce system or enterprise resource planning system (e.g. integration into work machine rental contracts for time and location based inputs derived from system equipment/work machine data).

In a further example, machines or products at a work site automatically create or join a local area network (e.g., a mesh network) created by and among the assets themselves. A plurality of work machines may each be configures to wirelessly communicate with the other work machines. For example, each work machine may include a connectivity module 320 for communicating with other machines and computing systems. A first work machine may detect that a second work machine is within a signal range of the connectivity module and may automatically form a local area network with the second machine. Additional machines may join the local area network when they are brought within range of a machine or other computer system connected to the local area network. Each machine and computing system may function as a node of a mesh network. A mesh identifier may be automatically created upon creation of the mesh. A user may name the local area network using a user device connected to the local area network via at least one node. The user device may be configured to display a list of the machines connected to the local area network as a group Each machine in the local area network may be configured to transmit machine-specific data to the other machines in the network. Data may include a location of the machine, an operational height of the lifting complement of the machine, a location of the lifting implements, a speed of the machine, a direction of travel of the machine, and/or environmental sensor readings from the machine. When an additional machine joins the local area network, a notification may be sent to user device alerting to user that the machine has connected. The user may make a selection via the user device to disconnect and remove the machine from the local area network. In some embodiments machines may be automatically disconnected based on predefined criteria. For example, when a machine enters a transport mode or a tow mode, the machine may be automatically disconnected from the local area network. The connection may be reset when the machine is taken out of transport mode or tow mode. The user device may receive a notification when a machine is disconnected from the local area network. A machine may be required to transmit an access code in order to connect to the local area network. This may prevent unauthorized machines and devices from connecting to the network. Machines from different manufactures, owners, and operators may be configured to connect to the same network supporting the equipment grouping system and join the grouping system according to an access code (e.g. a customer key). In some examples, machine connection to the equipment grouping system may be controlled remotely (e.g. by a user at a remote work station). In some embodiments machines may be retrofitted with a connectivity module to allow them to connect to local area network.

Figure 4:
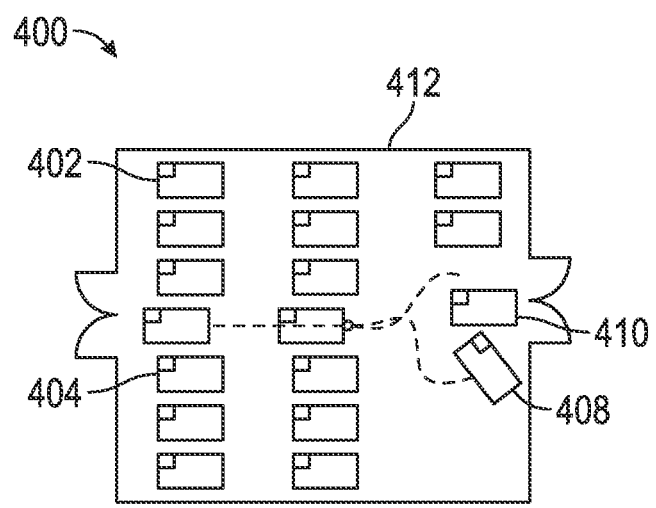
FIG. 4 is a schematic representation of a work site and equipment staging area with a local fleet connectivity system deployed, according to some embodiments.

As shown in FIG. 4, system for automatic generation of a work site equipment grouping 400 may be deployed at a work site 412 to control a fleet of work machines 402, 404, 408, 410 via the connectivity module 406 to collaboratively perform tasks requiring more than one work machine 408, 410. For example, a user may wish to move the work machine 410 from its stored position on the left of the work site 412 out the door on the right of the work site. The connectivity module may communicate with both the work machine 408 and the work machine 410, causing the work machine 408 to move out of the way of the work machine 410, so that the work machine 410 can move past the work machine 408 and out the doorway.

Figure 5:
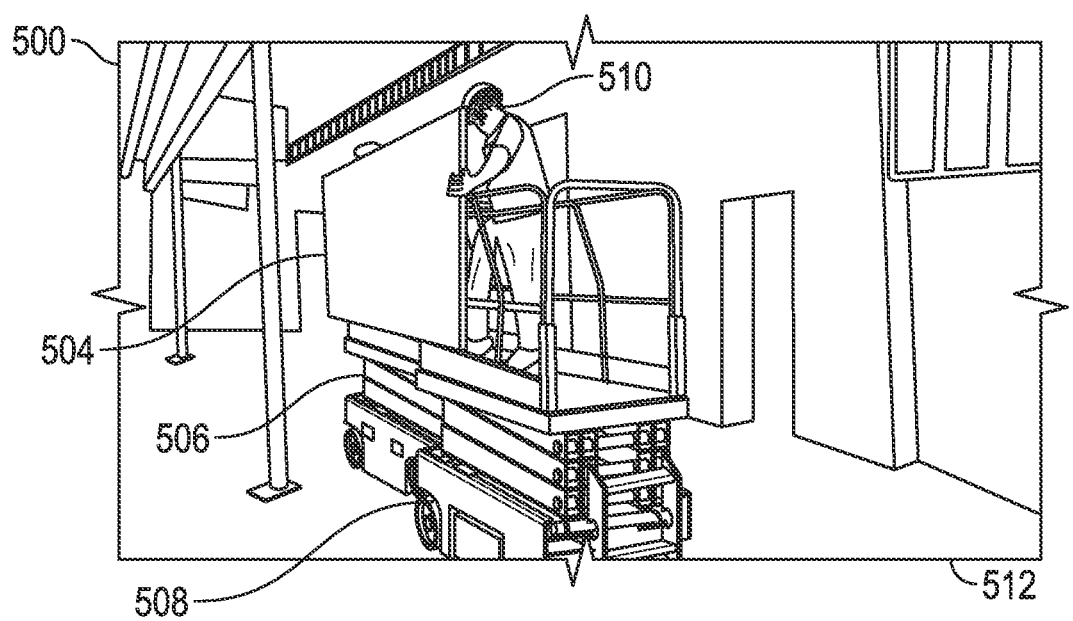
FIG. 5 is a picture representation of a work site with a local fleet connectivity system connecting two pieces of equipment, according to some embodiments.

As shown in FIG. 5, a plurality of work machines 506, 508 connected to system for automatic generation of work site equipment groupings 500 may collaboratively perform tasks on a jobsite 512 requiring more than one work machine, for example emplacing a section of drywall 504 that is too large to be handled by a single work machine. A user device may communicate with both the work machine 506 and the work machine 508 and cause them to move at the same speed and in the same direction so that a user 510 on each machine 506, 508 can hold the drywall 504 while the machines 508, 510 are moving. Connectivity between the machines 508, 508 and with the system for automatic generation of a work site equipment grouping 500 can prevent the machines 508, 510 from being separated so that the users 510 do not drop the drywall 504.

Figure 6:
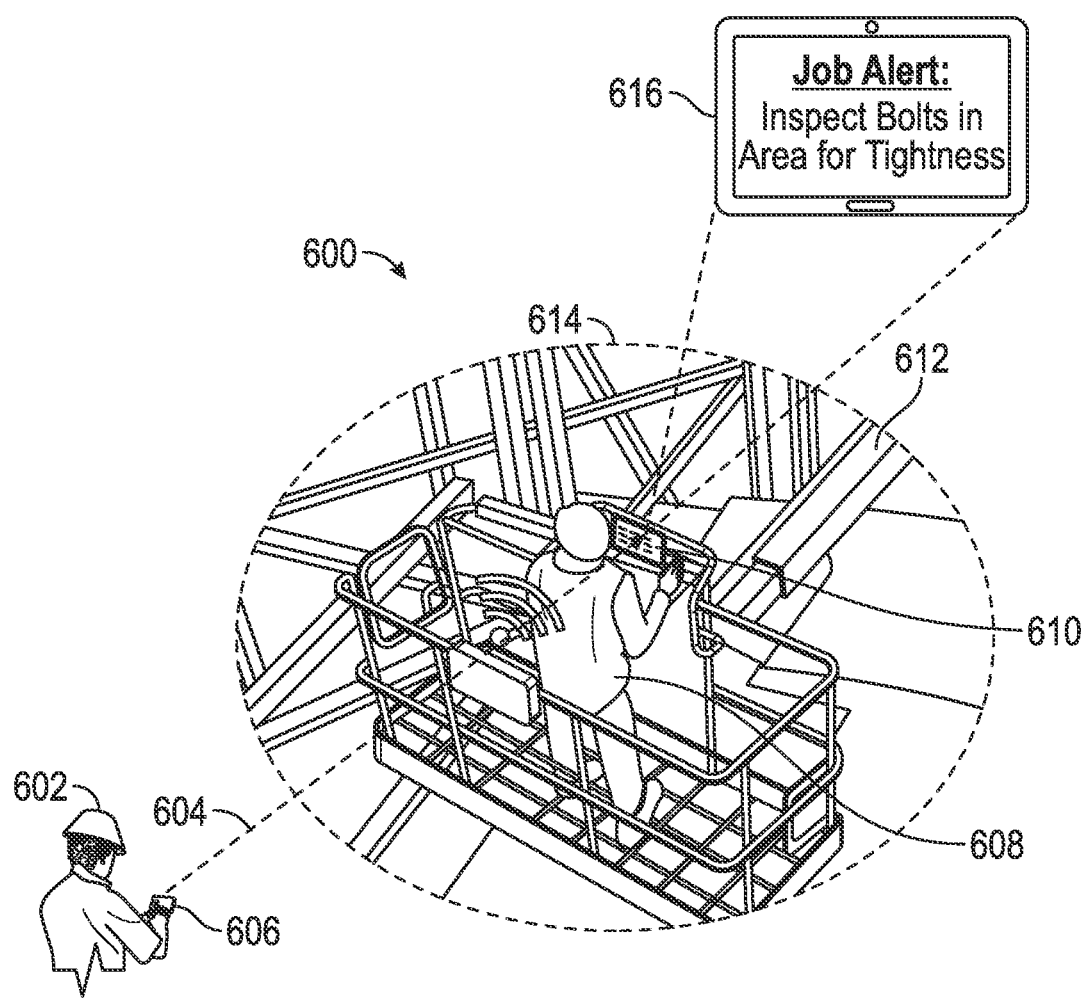
FIG. 6 is a picture representation of a piece of equipment with a local fleet connectivity system providing connectivity to a remote user, according to some embodiments.

As shown in FIG. 6, a remote user 602 of a system for automatic generation of work site equipment groupings 600 can send messages and data 604 from a remote device 606 to an onsite user 608 on a jobsite 614. The messages and data 604 may be received by the control system 610 of a work machine 612 and displayed via a user interface on an onboard display 616. The remote user 608 may send work instructions to the onsite user 608, informing the onsite user 608 of talks to be performed using the work machine 612. For example, as shown in FIG. 6, the remote user 602 may send instructions to the onsite user 608 to use the work machine 612 to inspect bolt tightness in the area. The instructions may displayed for the onsite user 608 on the onboard display 616. This allows the onsite user 608 to receive and view the instructions without the need to call the remote user 602 or write the instructions down. Because the work machine 612 is connected to the remote device 606 (e.g., via a connectivity module 218) the remote user 602 may receive the location of the work machine 612, as well as other work machines on the jobsite 614, and may use the location information to determine the instructions to send.

Figure 7:
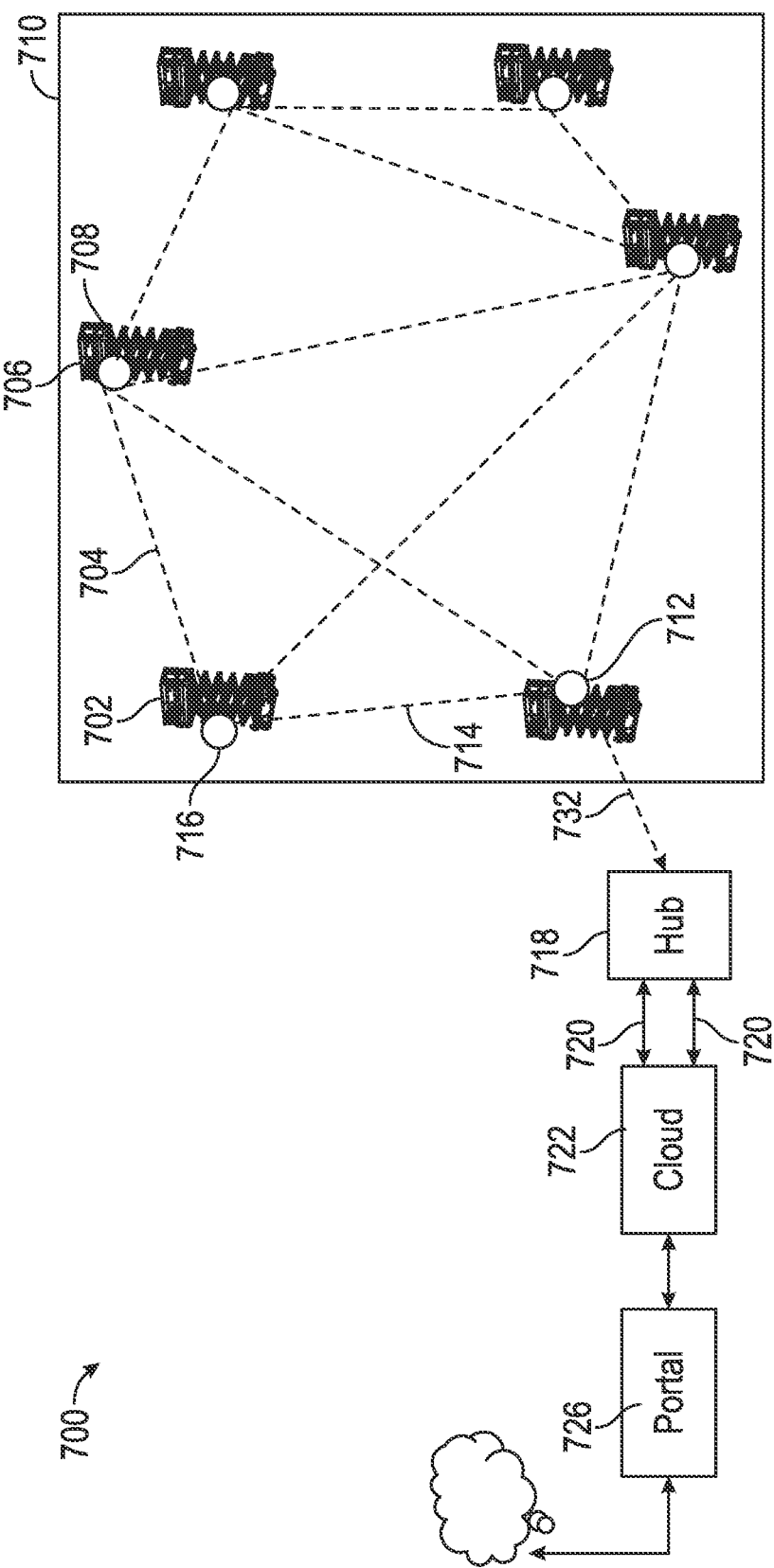
FIG. 7 is a schematic representation of a work site with a local fleet connectivity system deployed with connectivity to off-site systems, according to some embodiments.

Referring to FIG. 7, a system for automatic generation of a work site equipment grouping 700 includes a connectivity hub 718. In some embodiments, the connectivity hub includes a connectivity module. In some embodiments, the connectivity hub is configured to communicatively connect with one or more connectivity module equipped machines 702, 706 in proximity to the connectivity hub 718. In some embodiments, the connectivity hub is configured to broadcast a work site identification signal. In some embodiments, the connectivity hub is configured to connect work site machines 702, 706 connected to the local fleet network to an external internet feed 720. In some configurations, the connectivity hub is configured as a gateway to one or more communications systems or network systems to enable exchanges of data 720, 722 between nodes 708, 712, 716 on the work site 710 local fleet connectivity mesh network 704, 714, 732 and nodes 726 external to the work site.

In some embodiments, connectivity hub has a connectively module to (a) provides the functionalities described here in place of or in addition to a machine that has a connectivity module, (b) broadcasts a site identifier, or (c) connects to an external internet to flow through data to and from the jobsite that is provided across the mesh.

Figure 8:
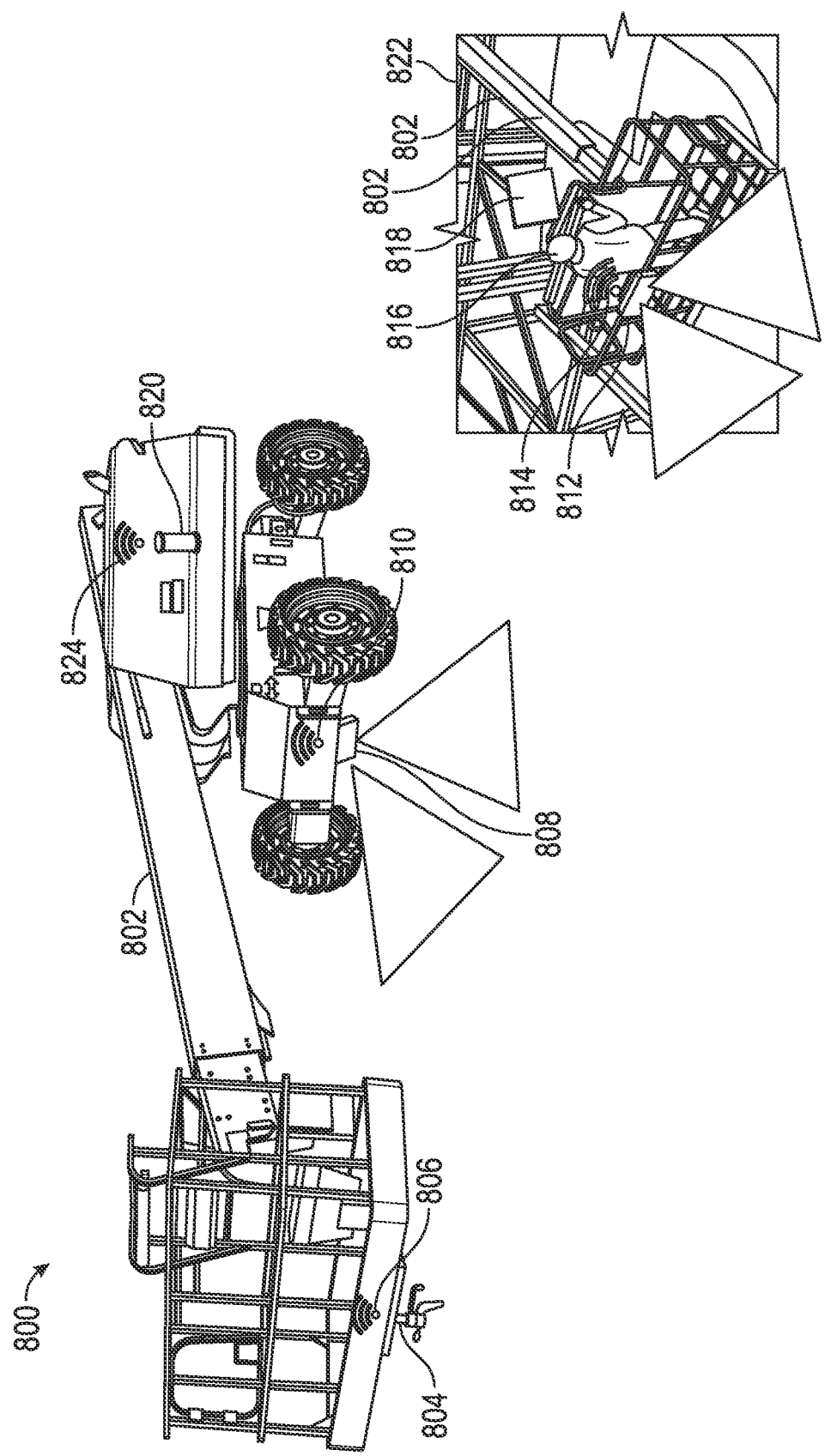
FIG. 8 is a picture representation of an apparatus configured with a local fleet connectivity system, according to some embodiments.

Referring to FIG. 8, a sensor network system 800 is shown. Sensors 804, 808, 812, 820 may be coupled to a work machine 802 on a jobsite 822. The sensors may be, for example, object detection sensors 808 812, environmental sensors 804 (e.g., wind speed, temperature sensors), and tagged consumable sensors 820. The sensors 804, 808, 812, 820 may be connected to and may send data to an equipment identification system via wireless connections 806, 810, 814, 824. The sensor data may displayed or may be used to generate messages for display on an onboard display 818 for a user 816 of the work machine 802. The onboard display 818 may receive the sensor data via a direct wired or wireless connection to the sensors. Alternatively the sensors may communicate with the onboard display through the equipment identification system (e.g., via a connectivity module 218). Sensor data from various work machines may be combined to map the jobsite 822 and to determine if environmental conditions are safe for using the work machines. Sensor data from the tagged consumable sensors 820 may be used to determine, for example, when tagged consumables must be replaced.

Figure 9:
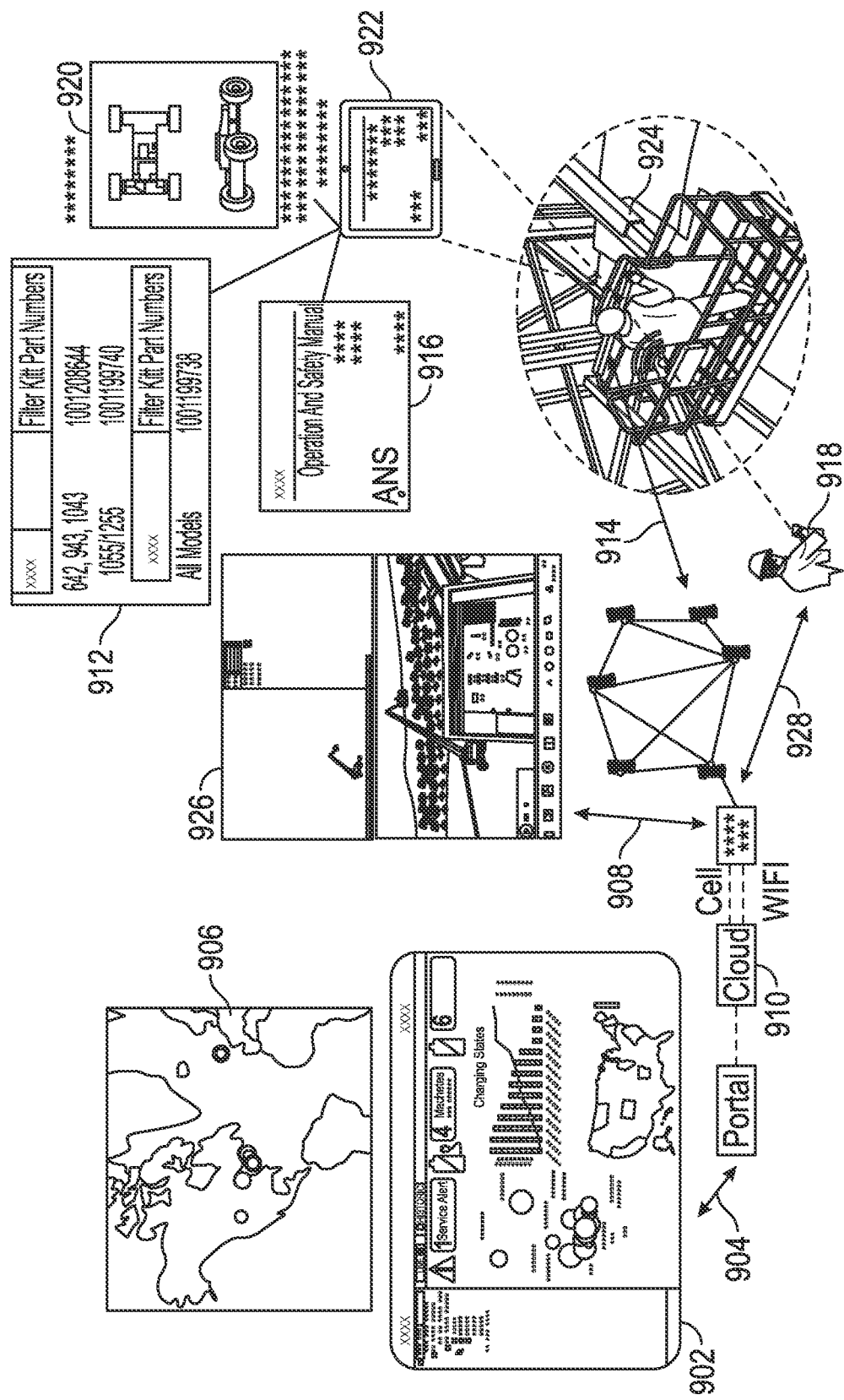
FIG. 9 is a graphical user interface of the local fleet connectivity system of FIG. 2, according to some embodiments.

As shown in FIG. 9, various user interfaces are available to be displayed on a remote user device 918 and an onboard display 922 of a work machine 924. A connectivity hub 910 may send and receive data 928, 908, 904 914 including the user interfaces 902, 906, 912, 916, 926, 920. The user interface 906 is a heatmap of locations of a plurality of work machines. The user interface 902 is a machine status display that shows the battery level, location, and alerts relating to a plurality of work machines. User interface 926 shows a digital twin of a work machine that updates based on sensor data of an associated work machine. User interface 912 is a list of part numbers for the work machine 924. User interface 916 is an operation and safety manual for the work machine 924. User interface 920 is a detailed schematic of the work machine 924.

Figure 10:
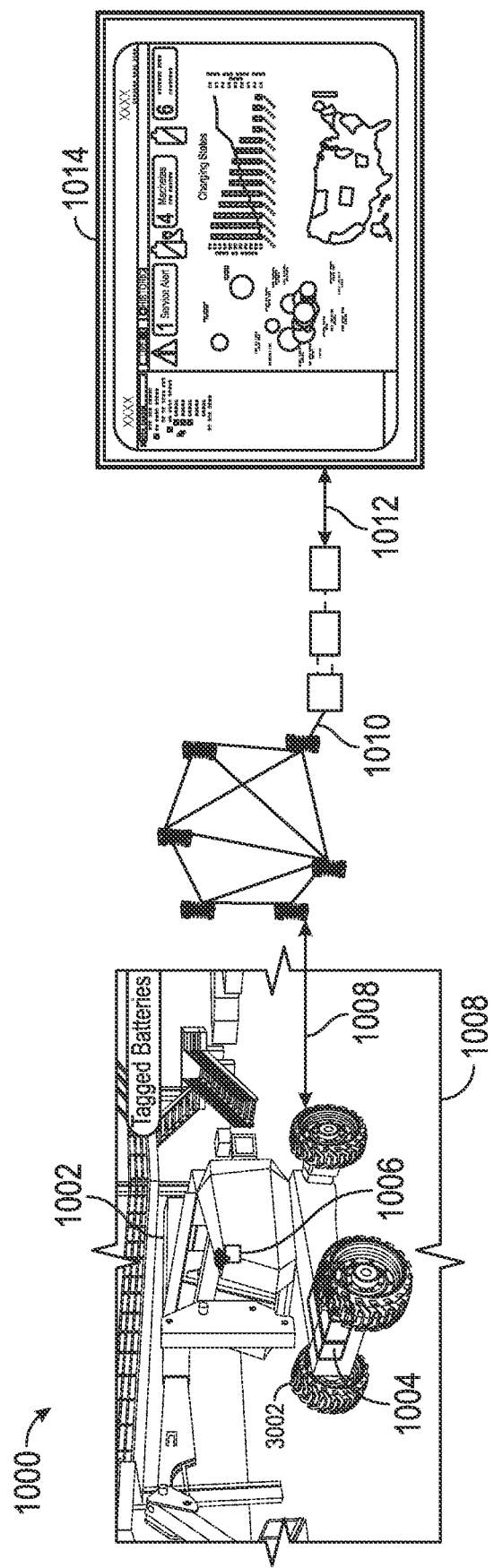
FIG. 10 is a picture representation of a work machine with machine specific output data connected to the local fleet connectivity system of FIG. 2, according to some embodiments.

As shown in FIG. 10, a tagged consumable tracking system 1000 is shown. A work machine 1002 on a jobsite 1008 includes tagged consumables 1004 (e.g., batteries connected to battery charger 1006). The machine 1002 sends and receives data 1016 to and from the connectivity hub 1010. The connectivity hub 1010 sends and receives data 1012 to and from a user interface 1014. Data regarding the tagged consumables 1004 may be communicated to the user interface 1014 via the connectivity hub 1010. For example, battery charge state and battery health may be sent to the user interface 1014. When the battery health falls below a predetermined state, for example, when the battery is only able to hold half of its original charge, the connectivity hub 1010 may send an alert to the user interface 1014 indicating that the battery should be replaced.

Figure 11:
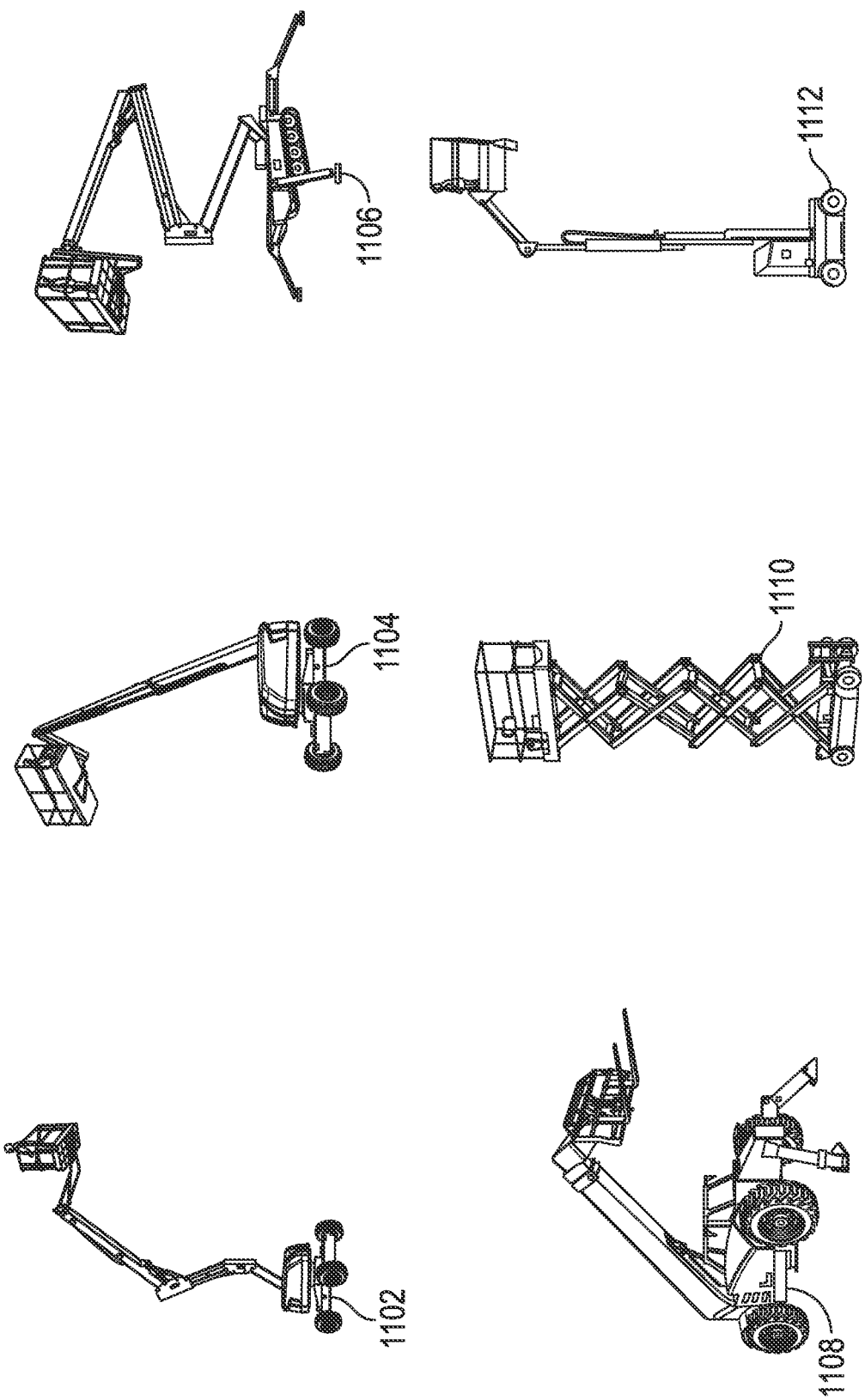
FIG. 11 is a picture representation of work machines configured for use in the local fleet connectivity system of FIG. 2, according to some embodiments

As shown in FIG. 11, the boom of telescoping boom lift 1104 includes a first boom section (e.g., lower boom, etc.) and a second boom section (e.g., upper boom, etc.). In other embodiments, the boom includes a different number and/or arrangement of boom sections (e.g., one, three, etc.). According to an exemplary embodiment (e.g., articulating boom lift 1102), the boom is an articulating boom assembly. In one embodiment, the upper boom is shorter in length than lower boom. In other embodiments, the upper boom is longer in length than the lower boom. According to another exemplary embodiment, the boom is a telescopic, articulating boom assembly. By way of example, the upper boom and/or the lower boom may include a plurality of telescoping boom sections that are configured to extend and retract along a longitudinal centerline thereof to selectively increase and decrease a length of the boom.

As shown in FIG. 11, the lower boom of telescoping boom lift 1104 has a first end (e.g., base end, etc.) and an opposing second end (e.g., intermediate end). According to an exemplary embodiment, the base end of the lower boom is pivotally coupled (e.g., pinned, etc.) to the turntable at a joint (e.g., lower boom pivot, etc.). The boom includes a first actuator (e.g., pneumatic cylinder, electric actuator, hydraulic cylinder, etc.), which has a first end coupled to the turntable and an opposing second end coupled to the lower boom. According to an exemplary embodiment, the first actuator is positioned to raise and lower the lower boom relative to the turntable about the lower boom pivot.

As shown in FIG. 11, the upper boom of telescoping boom lift 1104 has a first end (e.g., intermediate end, etc.), and an opposing second end (e.g., implement end, etc.). According to an exemplary embodiment, the intermediate end of the upper boom is pivotally coupled (e.g., pinned, etc.) to the intermediate end of the lower boom at a joint (e.g., upper boom pivot, etc.). As shown in FIG. 11, the boom of telescoping boom lift 1104 includes an implement (e.g., platform assembly) coupled to the implement end of the upper boom with an extension arm (e.g., jib arm, etc.). In some embodiments, the jib arm is configured to facilitate pivoting the platform assembly about a lateral axis (e.g., pivot the platform assembly up and down, etc.). In some embodiments, the jib arm is configured to facilitate pivoting the platform assembly about a vertical axis (e.g., pivot the platform assembly left and right, etc.). In some embodiments, the jib arm is configured to facilitate extending and retracting the platform assembly relative to the implement end of the upper boom. The boom includes a second actuator (e.g., pneumatic cylinder, electric actuator, hydraulic cylinder, etc.). According to an exemplary embodiment, the second actuator is positioned to actuate (e.g., lift, rotate, elevate, etc.) the upper boom and the platform assembly relative to the lower boom about the upper boom pivot.

According to an exemplary embodiment, the platform assembly is a structure that is particularly configured to support one or more workers. In some embodiments, the platform assembly includes an accessory or tool configured for use by a worker. Such tools may include pneumatic tools (e.g., impact wrench, airbrush, nail gun, ratchet, etc.), plasma cutters, welders, spotlights, etc. In some embodiments, the platform assembly includes a control panel to control operation of the work machines 20 (e.g., the turntable, the boom, etc.) from the platform assembly. In other embodiments, the platform assembly includes or is replaced with an accessory and/or tool (e.g., forklift forks, etc.).

Figure 12:
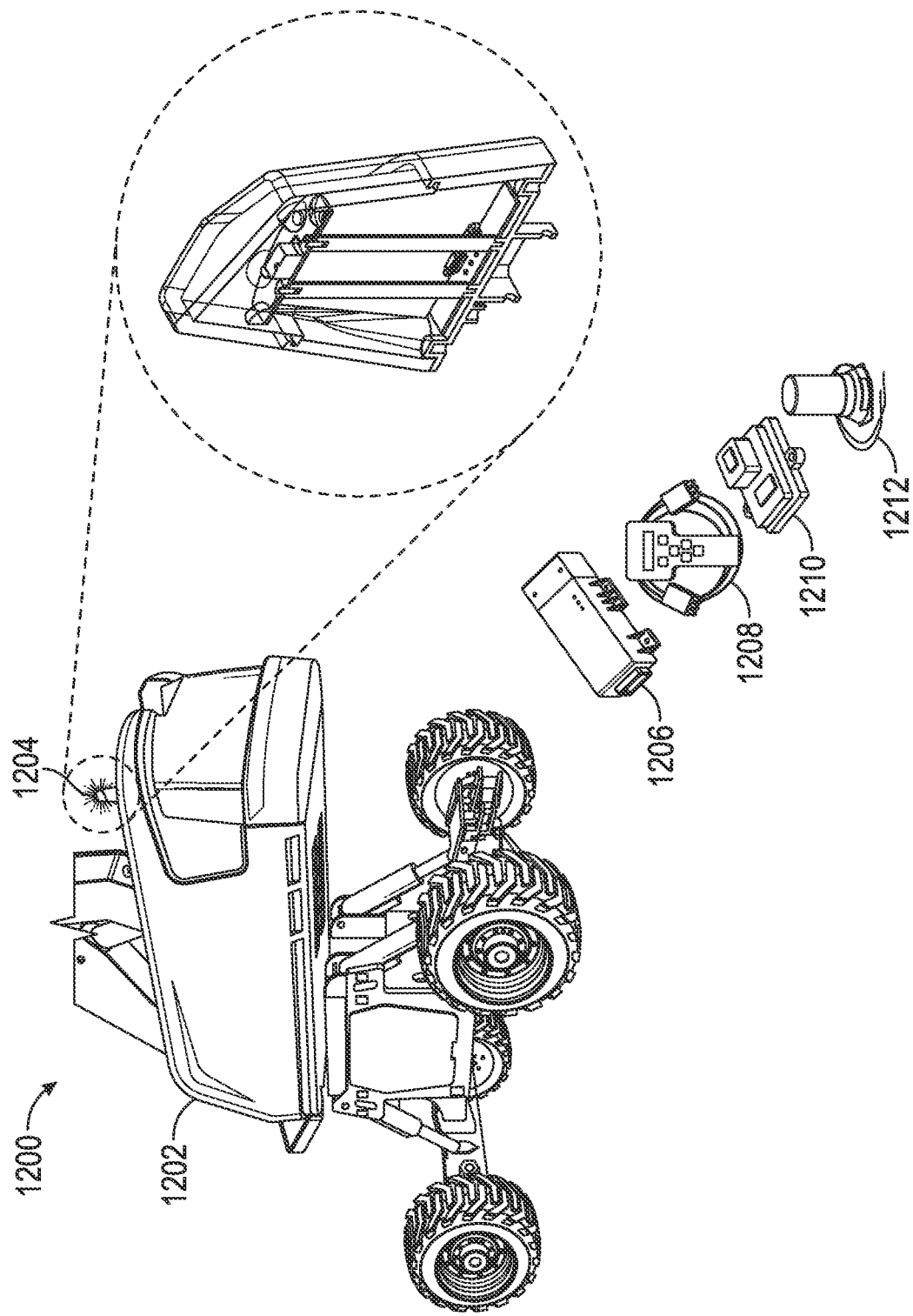
FIG. 12 is a picture representation of a work machine provisioned with an integrated connectivity module and beacon, according to some embodiments.

Referring to FIG. 12, a work machine 1202 is provisioned with an indicator 1204 (e.g. a connectivity module with integrated beacon light, control devices, and communications devices). The indicator 1204 may, for example, illuminate a light visible to a user in response to user activation of a "find my machine" or "identify my equipment" application hosted on a user device connected to the equipment identification system 200. The indicator 1204 may function like a conventional work machine warning beacon 1212.

In some embodiments, the connectivity module may be configured with a telematics control unit 1206, a multi-function light beacon 1212, one or more multi-channel communication modems 1210, one or more analytics devices 1208, one or more antennas, one or more power sources, one or more positioning systems, one or more local fleet connectivity processors, and one or more interface blocks, one or more machine connectivity provisions, and one or more memory devices. For example, the connectivity module with integrated beacon 1204 may be configured as an integrated connectivity device provisioned with all components required to connect a work machine 1202 that is not provisioned with networking equipment to a equipment identification system 200. The connectivity module with integrated beacon 1204 may include, for example, a telematics control unit specific componentry included (e.g. multicolor beacon, GPS/GNSS, communications modem, antenna, controller, memory device, interface blocks, housing, etc.) and be affixable to a work machine using temporary or permanent physical, electrical, or electronic connections. The connectivity module connected to the work machine may be configured to selectively enable, activate, disable, and deactivate components of the connectivity module and the work machine to which it is communicatively connected. For example, a connectivity module with integrated beacon 1204 connected to a work machine equipped with headlights may enable and activate the work machine headlights and disable the integral beacon in response to a "find me" command received by the connectivity module from the equipment identification system 200. The connectivity module with integrated beacon 1204 is configured, in some embodiments, to determine what components integral to the module and what components that are machine equipment are activated in response to a command such that only the components necessary to respond to the command are activated and no individual components are activated in conflict with the components activated to respond to the command.

Figure 13:
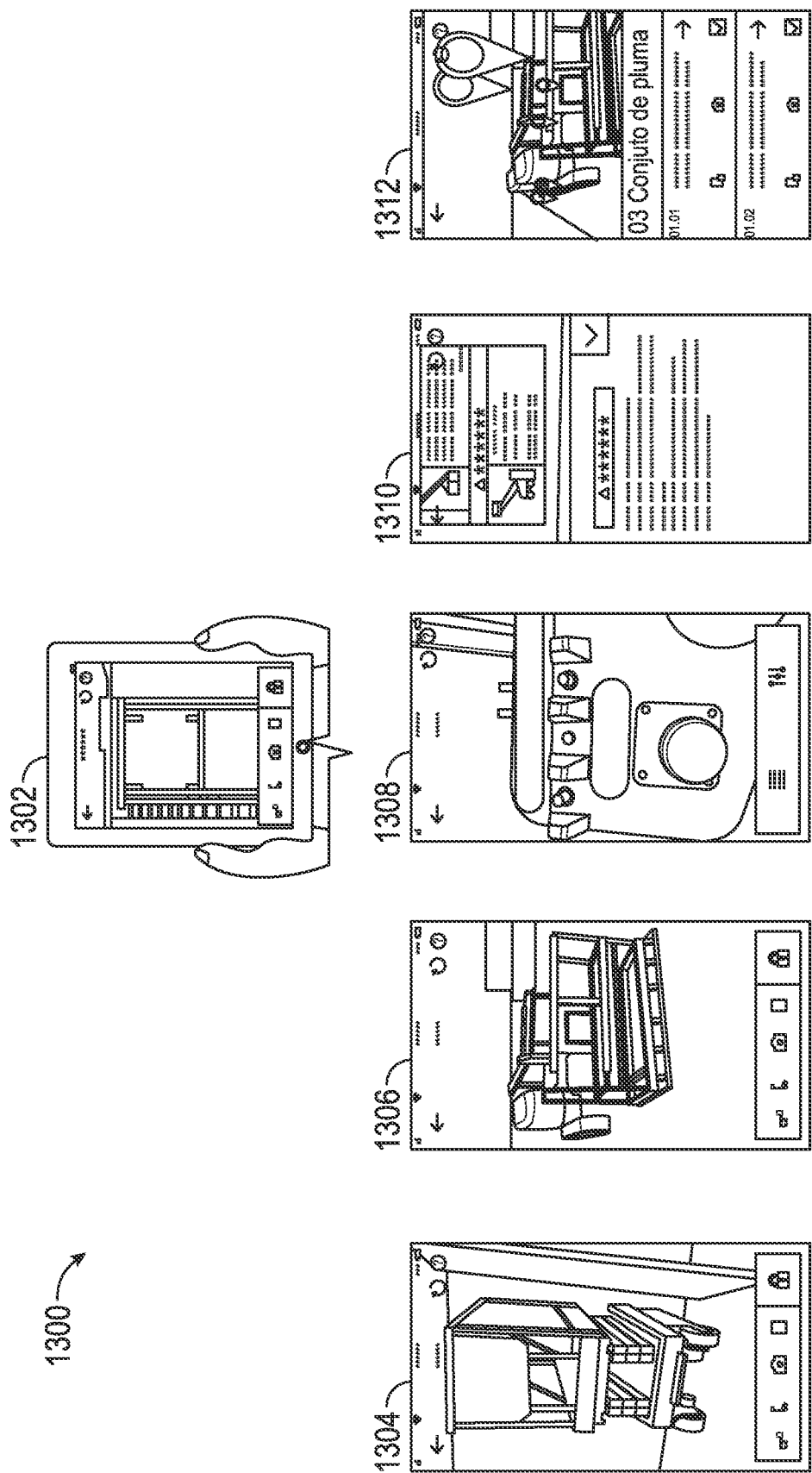
FIG. 13 is a picture representation of a series of user interface views of a local fleet connectivity application hosted on a user device, according to some embodiments.

Referring to FIG. 13, a series of user interface views of a local fleet connectivity application 1300 is shown according to some embodiments. A first user interface view, shown as view 1302, may include a model of a machine 202 to view the size of the machine 202 relative to a location visible through a camera of a user device. A second user interface view, shown as view 1304, may be another view including a model of a machine 202 to view the size of the machine 202 relative to a different location visible through the camera of the user device. A third user interface view, shown as view 1306, may include a picture of a machine 202 and interactive points to enable a user to identify the machine 202 and obtain more information about the machine 202. A fourth user interface view, shown as view 1308, may include an image of a portion of a machine 202 as seen via the camera of the user device and interactive points to enable a user to identify parts of the portion of the machine and to obtain information about how to operate the parts. A fifth user interface view, shown as view 1310, may include a picture of a machine decal as seen via the camera of the user device and display additional information regarding the machine decal. A sixth user interface view, shown as view 1312, may include a plurality of machine options and an image of a selected option relative to a location visible through the camera of the user device.

Figure 14:
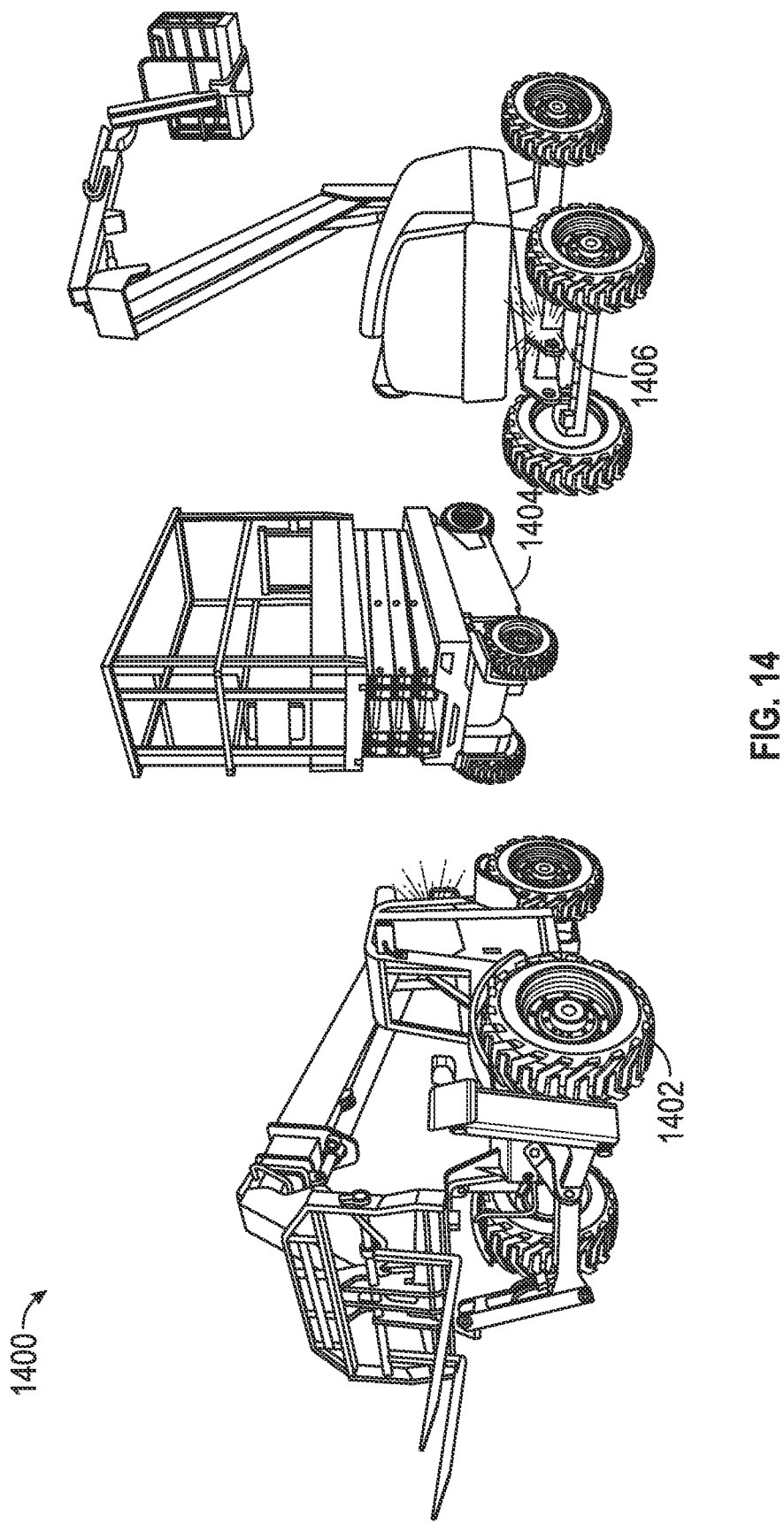
FIG. 14 is a picture representation of a fleet of work machines at a work site connecting to the local fleet connectivity system, according to some embodiments.
Figure 16:
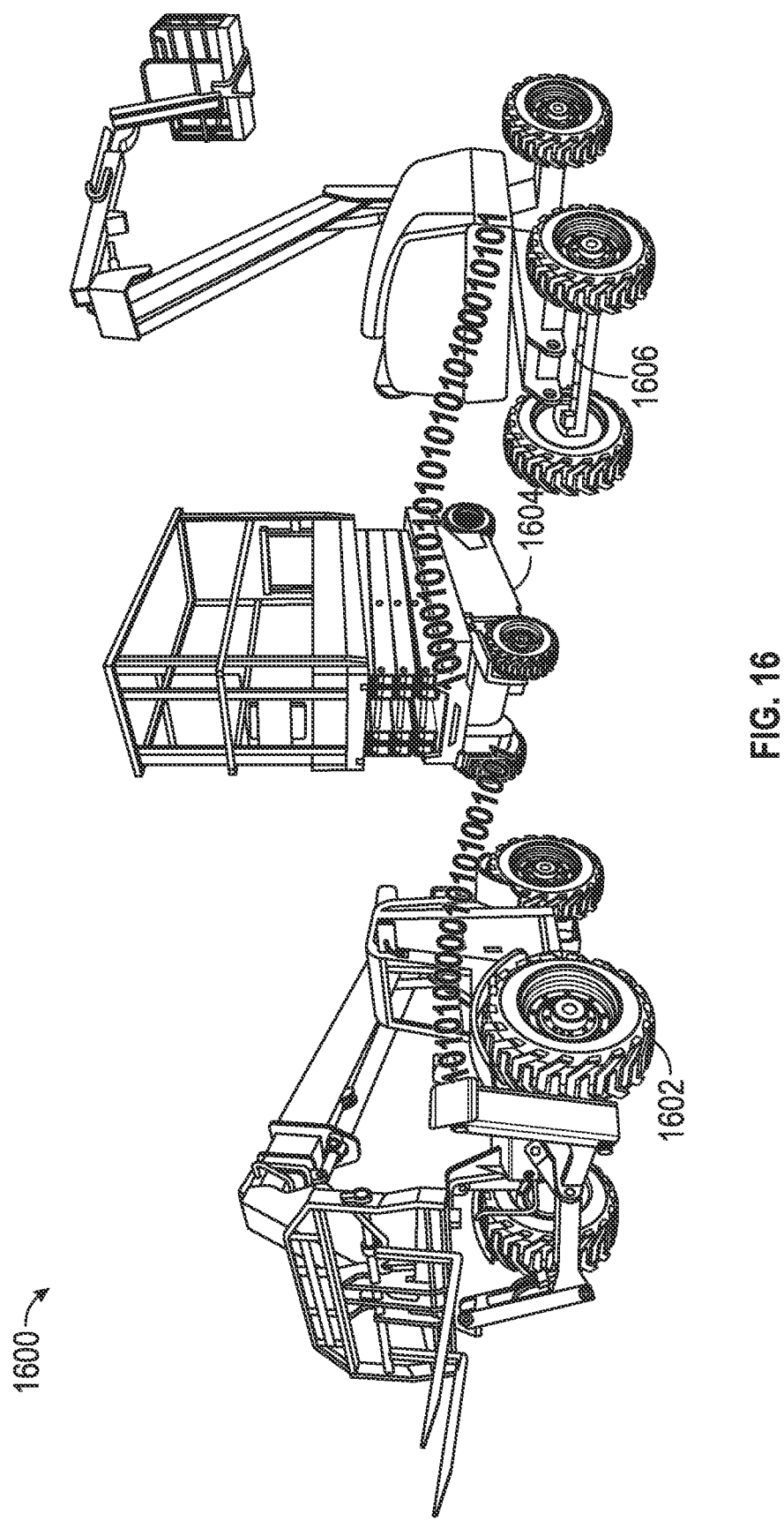
FIG. 16 is a drawing representing digital machine to machine communications between machines connected to a local fleet connectivity system at a work site, according to some embodiments.

As shown in FIGS. 14-16, individual work machines 1402, 1404, 1406, 1502, 1504, 1506, 1602, 1604, 1606 at a work site 1400, 1500, 1600 automatically connect to one another on a local area network, for example a system for automatic generation of work site equipment groupings 200.

Referring now to FIG. 16, machines 1602, 1604, 1606 connected to the local area network may transmit information to the cloud for data processing and for simple fleet management. In other words all machines on a particular job-site could easily be identified and accessed and grouped by site. Notifications may also be used to alert persons with the correct permissions when machines are checked in or out. Products, for example work machines 1602, 1604, 1606, automatically create or join a mesh network, (e.g. a system for automatic generation of work site equipment groupings 200) created by and among the assets themselves. A mesh identifier is automatically created upon creation of the mesh. Customer can name the mesh network. After joining the mesh, the machine may provide an indication that it "arrived." When the machine enters tow mode, when the machine enters a transport mode, when the machine leaves the mesh, etc., the machine provides an indication that it left the jobsite. Whenever two or more assets are there, they talk across the same network. The system and methods for automatic generation of work site equipment groupings is agnostic as to machine type, manufacturer, owner, status, etc. as the system provides for machines, including machines from different manufacturers to be part of the same network through, for example, connectivity modules.

Figure 17:
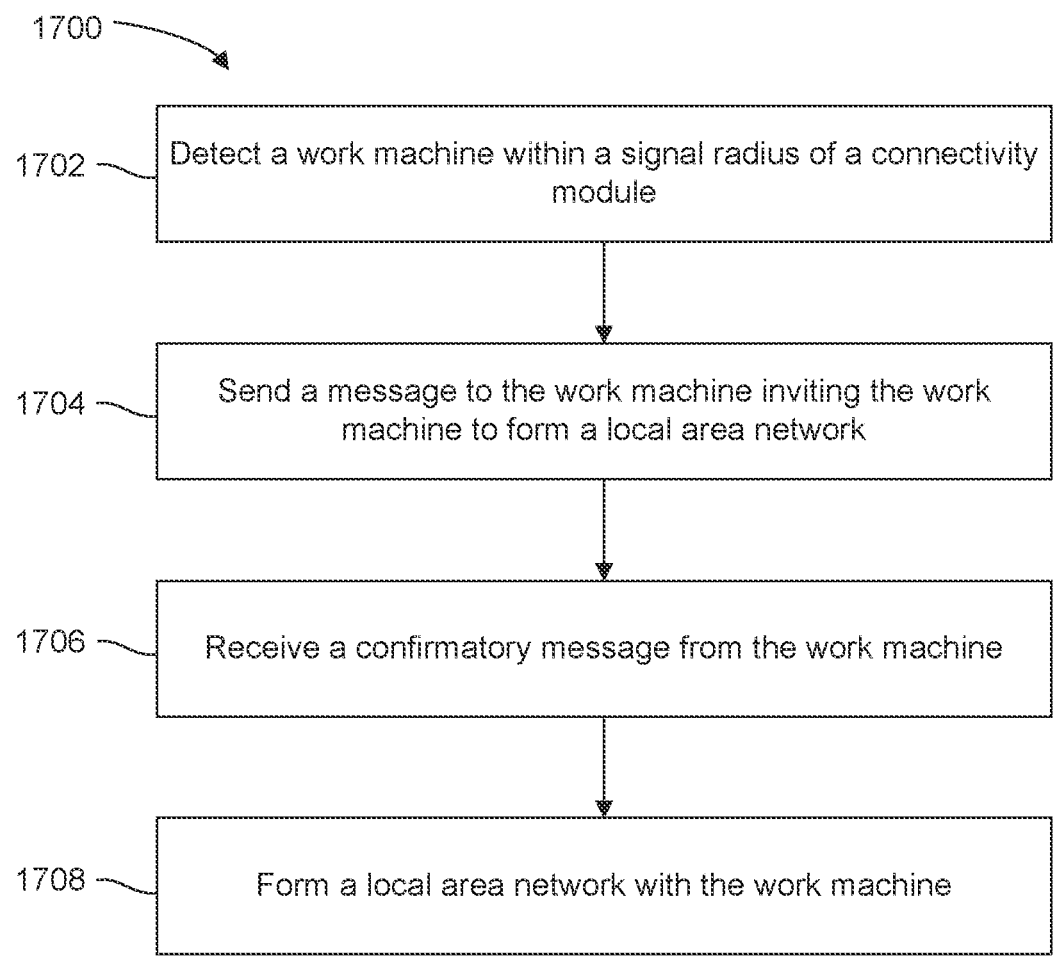
FIG. 17, is a flow diagram of a method for automatic generation of work site equipment groupings, according to some embodiments.
Figure 18:
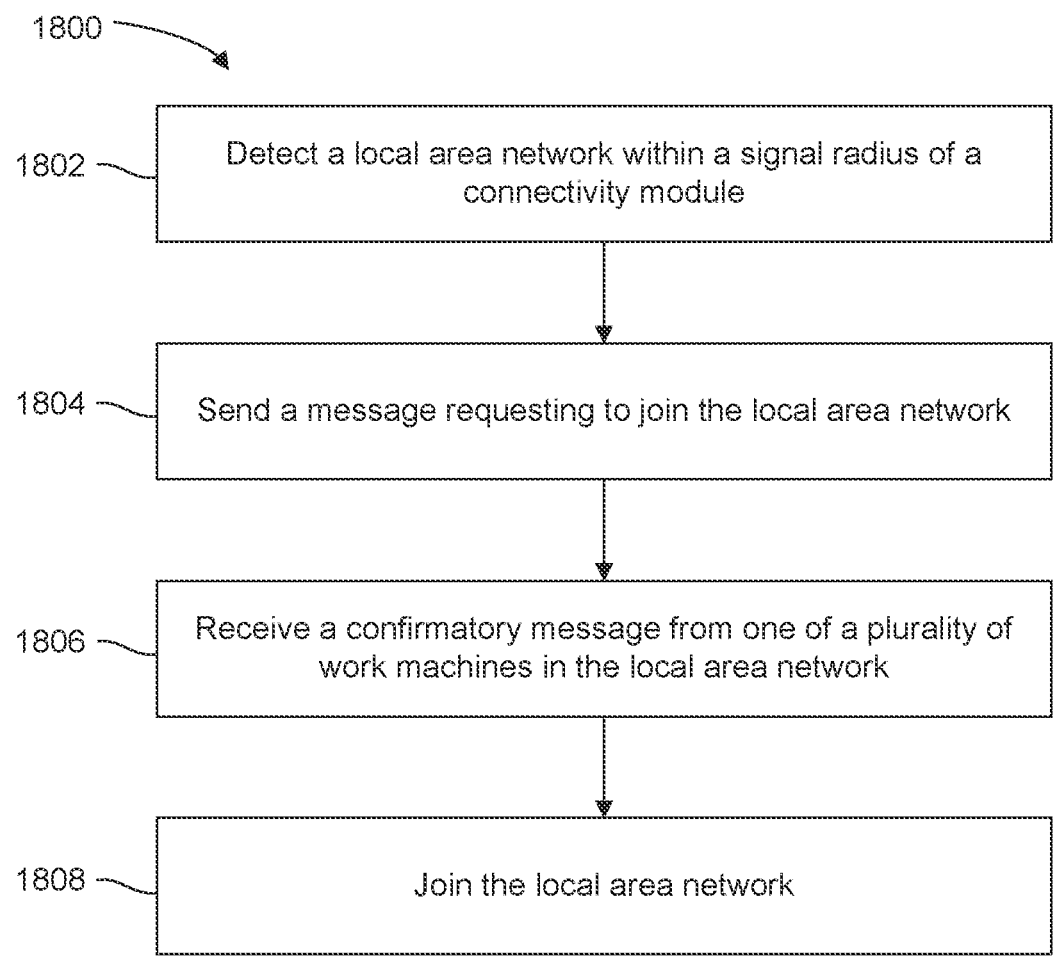
FIG. 18, is a flow diagram of a method for automatic generation of work site equipment groupings, according to some embodiments.

Referring to FIGS. 17 and 18, other embodiments of the present disclosure include a process 1700 (or method) and a process 1800 for automatic generation of work site equipment groupings. The method may be performed by one or more processing circuits connected to a work machine. For example, the processing circuits may be part of or connected to the controller of a machine (e.g., controller 322 of machine 324). The processing circuits may include one or more memory devices coupled to one or more processors. The one or more memory devices may be configured to store instructions thereon that, when executed by the one or more processors, cause the one or more processors to perform the operations of the method. The machine may include a connectivity module for communicating with the other machines and computing systems (e.g. connectivity modules 218, 320). The one or more processing circuits may communicate across a wireless network by sending messages to the one or more machines and to one or more user devices each communicatively connected to the network. A user may interact with the machines via an application provided on the user device that displays a graphical user interface (GUI).

Following commissioning or activation of a system for automatic generation of a work site equipment grouping, a first machine may be deployed to a work site. The process 1700 begins at operation 1702, with the detection of a second work machine within a signal radius of a connectivity module of the first work machine. At operation 1704, the first machine sends a message to the second work machine inviting the second work machine to form a local area network with the first work machine. At operation 1706, the first work machine receives a confirmatory message from the second work machine confirming that a local area network can be created between the first work machine and the second work machine. At operation 1708, the first work machine forms a local area network with the second work machine. The connectivity module of the first work machine may include a beacon (e.g. beacon 326) which may include a light and/or a sound generating device. The beacon may provide a visual or audible indication that the mesh network has been created. In some embodiments the first work machine (or the second work machine) may detect one or more additional work machines within a signal radius of the connectivity module of the first work machine. The first work machine (or the second work machine) may send a message to the additional work machines inviting them to join the mesh network. The first work machine (or the second work machine) may then receive a confirmatory message from the additional work machines and may add the additional work machines to the mesh network. The beacon of the first work machine (and/or the other machines) may provide a visual or audible indication that the additional machines have been connected to the network. The first work machine (and/or the other machines) may send notification to a user device connected to the network informing a user that the machines have connected to the network. The first work machine (and/or the other machines) may detect that a third work machine has left the local area network and may send a notification to the user device to notify the user.

The process 1800 relates to a machine connecting to an established local area network of work machines at a work site. The process 1800 begins at operation 1802, with the detection of a local area network, including a plurality of work machines, within a signal range of a connectivity module of a first work machine. For example, the first work machine may detect a second work machine that is connected to the local area network. At operation 1804, the first work machine sends a message to the second work machine via the connectivity module requesting to join the local area network. At operation 1806, the first work machine receives a confirmatory message from the second work machine and at operation 1808, the first work machine joins the local area network. The first work machine may then send a notification to a user device connected to local area network indicating that the first work machine has joined the network. A beacon coupled to the first work machine may also provide a visual or audible indication that the first work machine has joined the network. In the event that the first work machine becomes disconnected from the local area network, the beacon may provide a visual or audible indication that the first work machine has been disconnected. One of the other machines in the network may also send a message to the user device indicating that the first machine has been disconnected.

Machines and associated local groupings (e.g. machines on the same worksite network) are registered on the local fleet connectivity system and are accessible to users via a user device. Machines may transmit information to the cloud for data processing and for simple fleet management. Notifications are generated to alert persons with the correct permissions as to machine status, condition, changes to status/condition, etc., for example, when machines are checked in or out. Machines are disassociated from the work site equipment grouping according to stored criteria or user inputs.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using one or more separate intervening members, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic. For example, circuit A communicably "coupled" to circuit B may signify that the circuit A communicates directly with circuit B (i.e., no intermediary) or communicates indirectly with circuit B (e.g., through one or more intermediaries).

While various circuits with particular functionality are shown in FIGS. 1-3, it should be understood that the controller 44 may include any number of circuits for completing the functions described herein. For example, the activities and functionalities of the control system 60 may be combined in multiple circuits or as a single circuit. Additional circuits with additional functionality may also be included. Further, the controller 44 may further control other activity beyond the scope of the present disclosure.

As mentioned above and in one configuration, the "circuits" of the control system 60 may be implemented in machine-readable medium for execution by various types of processors, such as the processor 52 of FIG. 1. An identified circuit of executable code may, for instance, comprise one or more physical or logical blocks of computer instructions, which may, for instance, be organized as an object, procedure, or function. Nevertheless, the executables of an identified circuit need not be physically located together, but may comprise disparate instructions stored in different locations which, when joined logically together, comprise the circuit and achieve the stated purpose for the circuit. Indeed, a circuit of computer readable program code may be a single instruction, or many instructions, and may even be distributed over several different code segments, among different programs, and across several memory devices. Similarly, operational data may be identified and illustrated herein within circuits, and may be embodied in any suitable form and organized within any suitable type of data structure. The operational data may be collected as a single data set, or may be distributed over different locations including over different storage devices, and may exist, at least partially, merely as electronic signals on a system or network.

While the term "processor" is briefly defined above, the term "processor" and "processing circuit" are meant to be broadly interpreted. In this regard and as mentioned above, the "processor" may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

Although this description may discuss a specific order of method steps, the order of the steps may differ from what is outlined. Also, two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps, and decision steps.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

It is important to note that the construction and arrangement of the load map interface systems and methods as shown in the various exemplary embodiments is illustrative only. Additionally, any element disclosed in one embodiment may be incorporated or utilized with any other embodiment disclosed herein. For example, the warning zones of the exemplary embodiment may be eliminated or additional zones may be added. Although only one example of an element from one embodiment that can be incorporated or utilized in another embodiment has been described above, it should be appreciated that other elements of the various embodiments may be incorporated or utilized with any of the other embodiments disclosed herein.

Although only a few embodiments of the present disclosure have been described in detail, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claims.

What is claimed is:

1. A system for automatic generation of a work site equipment grouping, the system comprising:
   a plurality of work machines including a first work machine, a second work machine, and a third work machine, each work machine configured to wirelessly communicate with other work machines;
   a local area network including a plurality of communicatively connected nodes, the nodes comprising the work machines,
   wherein the first work machine is configured to:
      detect the second work machine within a signal range of the first work machine; and
      upon detecting the second work machine, automatically create the local area network via a direct wireless connection with the second work machine; and
   wherein the third work machine is configured to automatically join the local area network when the third work machine is within a signal range of one or both of the first work machine or the second work machine.

2. The system of claim 1, wherein each work machine is configured to transmit, via the local area network, machine-specific data to the other work machines.

3. The system of claim 2, wherein the machine-specific data comprises at least one of a location of a work machine, an operational height of a lifting implement of a work machine, a location of the lifting implement, a speed of a work machine, a direction of travel of a work machine, or environmental sensor readings.

4. The system of claim 1, wherein at least one node is communicatively connected to a remote computing system, and wherein the remote computing system is configured to process data from the local area network.

5. The system of claim 1, wherein a network identifier is automatically generated when the local area network is created.

6. The system of claim 1, wherein the local area network is a mesh network.

7. The system of claim 1, further comprising a user device, wherein at least one node is communicatively connected to the user device, and wherein the user device is configured to display a list of work machines connected to the local area network as a group.

8. The system of claim 7, wherein the user device is configured to receive a notification when a work machine joins or leaves the local area network.

9. The system of claim 7, wherein work machines are configured to be removed from the local area network based on inputs from the user device or based on predefined criteria.

10. The system of claim 1, wherein, to join the local area network, a work machine is required to transmit an access code to at least one work machine connected to the local area network, wherein the local area network is associated with a customer, and wherein the access code is a customer key identifying the work machine as associated with the customer.

11. The system of claim 1, wherein each work machine is communicatively connected to the local area network via a connectivity module coupled to each respective work machine.

12. A first work machine comprising:
a chassis;
a lifting implement coupled to the chassis;
a connectivity module coupled to the chassis, the connectivity module configured to wirelessly communicate with nodes in a network; and
one or more processing circuits coupled to the connectivity module, the one or more processing circuits comprising one or more memory devices coupled to one or more processors, the one or more memory devices configured to store instructions thereon that, when executed by the one or more processors, cause the one or more processors to:
detect, via the connectivity module, a second work machine within a signal radius of the connectivity module;
send, via the connectivity module, a message to the second work machine inviting the second work machine to form a local area network with the first work machine;
receive, via the connectivity module, a confirmatory message from the second work machine;
form the local area network with the second work machine;
detect, via the connectivity module, a third work machine within a signal radius of the connectivity module;
send, via the connectivity module, a message to the third work machine inviting the third work machine to join the local area network;
receive, via the connectivity module, a confirmatory message from the third work machine; and
add the third work machine to the local area network.

13. The first work machine of claim 12, wherein the connectivity module comprises a beacon comprising at least one of a sound-generating device or a light, and wherein the instructions further cause the one or more processors to:
instruct, in response to forming the local area network, the beacon to provide an indication that the network has formed, the indication comprising at least one of a visual signal from the light or an audible signal from the sound-generating device.

14. The first work machine of claim 12, wherein the instructions further cause the one or more processors to send, via the connectivity module, a notification to a user device communicatively coupled to the local area network that the third work machine has been added to the local area network.

15. The first work machine of claim 12, wherein the instructions further cause the one or more processors to:
detect, via the connectivity module that the one of the second work machine or the third work machine has been disconnected from the local area network;
send, via the connectivity module in response to detecting that the second work machine has been disconnected the local area network, a notification, to a user device communicatively coupled to the local area network, that the second work machine has left the local area network; and
send, via the connectivity module in response to detecting that the third work machine has left the local area network, a notification, to the user device, that the third work machine has left the local area network.

16. The first work machine of claim 12, wherein the connectivity module comprises a beacon comprising at least one of a sound-generating device or a light, and wherein the instructions further cause the one or more processors to:
instruct, in response to detecting that the first work machine has been disconnected from the local area network, the beacon to provide an indication that the first work machine has left the local area network, the indication comprising at least one of a visual signal from the light or an audible signal from the sound-generating device.

17. A system for automatic generation of a work site equipment grouping, the system comprising:
a plurality of work machines including a first work machine, a second work machine, and a third work machine, each work machine configured to wirelessly communicate with other work machines; and
a local area network associated with a customer and comprising the first work machine and the second work machine,
wherein the third work machine is configured to:
detect the first work machine or the second work machine within a signal range of the third work machine;
upon detecting the first work machine or the second work machine, transmit a customer key identifying the third work machine as associated with the customer to the first work machine or the second work machine;
receive a confirmation from the first work machine or the second work machine that the customer key is associated with the customer, the confirmation granting access to the local area network; and
upon receiving the confirmation, join the local area network.

* * * * *